(12) United States Patent
Han et al.

(10) Patent No.: US 10,191,308 B2
(45) Date of Patent: Jan. 29, 2019

(54) OPTOELECTRONIC DEVICE AND SMART WINDOW COMPRISING THE SAME

(71) Applicants: Samsung Electronics Co., Ltd., Suwon-si, Gyeonggi-do (KR); The Regents of the University of California, Oakland, CA (US)

(72) Inventors: Seunghoon Han, Seoul (KR); Yanping Liu, Albany, CA (US); Jie Yao, Berkeley, CA (US); Kyle Tom, Berkeley, CA (US)

(73) Assignees: SAMSUNG ELECTRONICS CO., LTD., Suwon-si (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/375,554

(22) Filed: Dec. 12, 2016

(65) Prior Publication Data

US 2017/0168327 A1    Jun. 15, 2017

Related U.S. Application Data

(60) Provisional application No. 62/265,816, filed on Dec. 10, 2015.

(30) Foreign Application Priority Data

Dec. 8, 2016   (KR) .................. 10-2016-0166884

(51) Int. Cl.
*G02F 1/061*     (2006.01)
*G02B 1/14*      (2015.01)
(Continued)

(52) U.S. Cl.
CPC .............. *G02F 1/061* (2013.01); *E06B 7/28* (2013.01); *E06B 9/24* (2013.01); *G02B 1/14* (2015.01);
(Continued)

(58) Field of Classification Search
CPC ...... G02F 1/29; G02F 1/292; G02F 2001/291; G02F 1/03; G02F 2202/30; B82Y 20/00
(Continued)

(56) References Cited

U.S. PATENT DOCUMENTS 6,946,597 B2 *   9/2005   Sager .................. H01L 51/4213
                                                                136/255
7,042,615 B2     5/2006   Richardson
(Continued)

FOREIGN PATENT DOCUMENTS

JP       2013-257482 A    6/2012
KR     2016-0096527 A    8/2016

OTHER PUBLICATIONS

Deepa et al., Electrochemistry of poly(3,4-ethylenedioxythiophene)-polyaniline/Prussian blue electrochromic devices containing an ionic liquid based gel electrolyte film, *Physical Chemistry Chemical Physics*, 11: 5674-5685 (2009).

*Primary Examiner* — Mohammed Hasan
(74) *Attorney, Agent, or Firm* — Leydig, Voit & Mayer, Ltd.

(57) ABSTRACT

Provided is an optical modulator having high resolution and being capable of controlling a wavelength range of reflected/transmitted light. The optical modulator may include a plurality of nanostructures capable of changing refractive index and a first insulation layer surrounding the plurality of nanostructures. The refractive index of each of the nanostructures may be greater than that of the first insulation layer. The nanostructures may modulate light depending on a change in the refractive index thereof. A change in a resonance wavelength, intensity, phase, polarization, etc. of reflected/transmitted light may be generated.

20 Claims, 27 Drawing Sheets

(51) Int. Cl.
- *E06B 7/28* (2006.01)
- *E06B 9/24* (2006.01)
- *G02B 26/02* (2006.01)

(52) U.S. Cl.
CPC ...... *G02B 26/02* (2013.01); *E06B 2009/2464* (2013.01); *G02F 2201/12* (2013.01); *G02F 2202/02* (2013.01); *G02F 2202/36* (2013.01)

(58) Field of Classification Search
USPC ........................................................ 359/315
See application file for complete search history.

(56) References Cited

U.S. PATENT DOCUMENTS

| | | |
|---|---|---|
| 9,632,216 B2 | 4/2017 | Han et al. |
| 2014/0030600 A1* | 1/2014 | Kwon ............ H01L 31/022466 429/231.8 |
| 2014/0185122 A1* | 7/2014 | Han ...................... B82Y 20/00 359/238 |
| 2015/0168747 A1* | 6/2015 | Kadono ................ G02F 1/015 348/360 |
| 2015/0303256 A1 | 10/2015 | Dubertret et al. |

* cited by examiner (a)

(b)

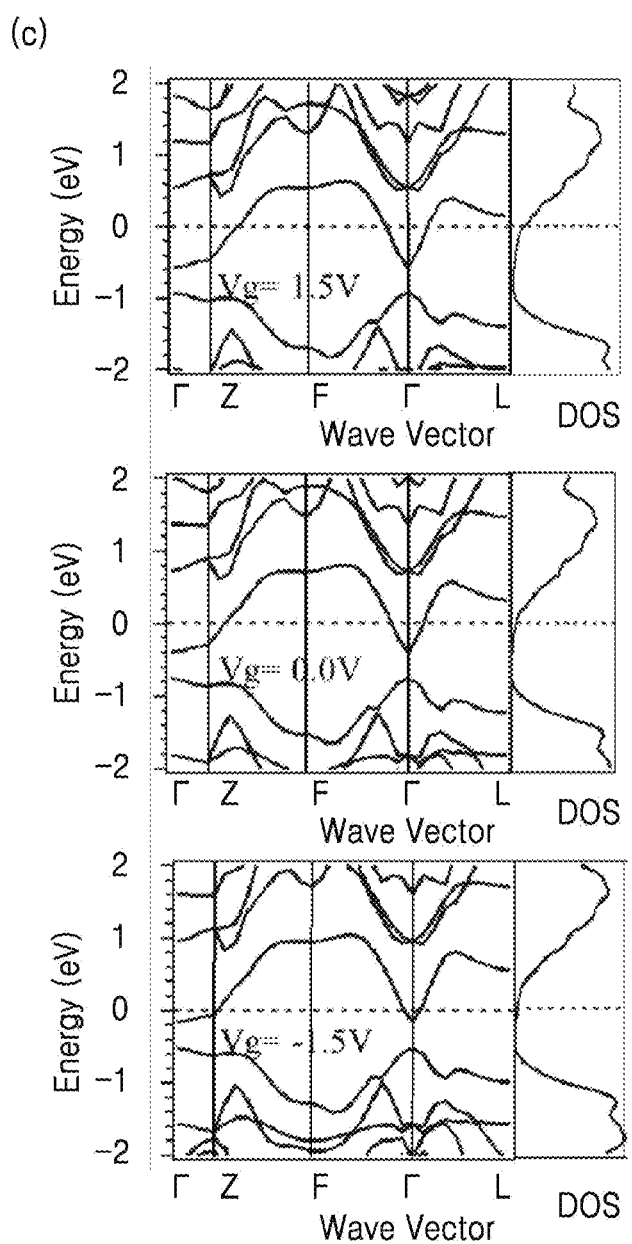

(a)

(b)

(c)

(d)

OPTOELECTRONIC DEVICE AND SMART WINDOW COMPRISING THE SAME

CROSS-REFERENCE TO RELATED APPLICATIONS

This application claims the benefit of U.S. Provisional Application No. 62/265,816, filed on Dec. 10, 2015, in the US Patent Office and Korean Patent Application No. 10-2016-00166884, filed on Dec. 8, 2016, in the Korean Intellectual Property Office, the disclosures of which are incorporated herein in their entireties by reference.

BACKGROUND

1. Field

The present disclosure generally provides optoelectronic devices incorporating layered structured materials and semiconductor thin films, and more particularly to control of the optical properties of such materials.

2. Description of the Related Art

Reducing energy consumption has become one of the primary goals for the world due to the onset of global warming and the potential for reducing costs for device operation. It is therefore favorable to find low power device alternatives to current technology, or devices that can indirectly reduce power consumption. This is especially true in many optical applications that require electrical control of optical properties. Altering the transmission of materials in the visible spectrum remains a formidable challenge, due to the difficulties of tuning the Fermi Level and charge-carrier density over a wide range.

Smart windows are a particular example of this kind of optical application. For example, buildings can account for up to 40% of a developed country's total energy usage. This is primarily caused by high heating, ventilation, and air conditioning (HVAC) costs. One of the most promising ways of reducing these costs is by reducing the amount of energy lost due to windows, mostly through inefficient insulation. Smart windows, windows that change their opacity under certain conditions, are a common solution to this problem. The most popular smart windows are electrically controlled, which allows them to be automated or controlled manually. This makes it very easy to change the windows properties to be the most efficient at any particular time of the day. However, it is difficult to create durable, low power windows that can induce large, reversible changes using an applied voltage. The best performing windows are also quite costly.

SUMMARY

In certain embodiments dynamic electrical control of the optical properties of the active layer includes a novel ionic liquid (IL) gating technique using low voltages (low power). These embodiments advantageously address many of the issues of smart windows and other low power optical devices.

To overcome the previously mentioned obstacles, an ionic liquid (IL) gating technique is used in certain embodiments to dynamically tune the optical properties in layered structure materials. According to certain embodiments, the general architecture is similar to a metal-on-semiconductor field effect transistor (MOSFET); a source and drain electrode are in contact with the active material and a gate electrode is placed away from the rest of the device. Then, an ionic liquid, e.g., an ionic salt that is liquid at room temperature, is applied over the device and takes the place of where the oxide dielectric would be in a MOSFET. By changing the voltage at the gate, large electron concentrations are induced, which ultimately change the optical properties of the active material. This novel IL technique demonstrated a tunable transmission window in ultrathin nanoplates (on the order of a few nanometers to tens of nanometers thick) in the visible and near infrared regions, with a low applied voltage operation range, e.g., from −3V~3V, which is equivalent to a typical AA battery. This allows for various embodiments to be used in any application that requires electrical control of the reflection, transmission, and absorption properties of a material.

Compared to using oxide dielectrics, the EDL techniques of the present embodiments offer lower-power, and a much stronger carrier concentration tuning ability. This leads to a greater change in transparency with a lower power consumption. The EDL gating approach of the present embodiments not only provides a powerful method for modulating the electronic transport and other physical properties in materials such as $Bi_2Se_3$, but also simplifies device fabrication. The EDL can be applied using a pipette to apply a small drop. Ionic liquids are prone to breakdown failure outside their electrochemical window, the largest voltage that can be applied before failure, which causes irreversible damage. Fortunately, changes up to 50% are possible well before the failure voltage.

Electrochromicity is another popular method of inducing similar changes in an active material. Electrochromicity has the advantage of being an established technology and the current standard for smart windows. It also does not require a constant applied voltage to keep a particular opacity level. Electrochromicity, however, uses chemical reactions in order to induce changes which can cause instability and unwanted byproducts. The embodiments herein depend on promoting charge carriers and are much more stable. Electrochromics are also prone to overheating. Ionic liquids are stable at high temperatures, decreasing the chance of failure from increased absorption. The present embodiments are also more powerful than electrochromics, inducing much larger changes over the same voltage range. This also allows thinner active layers to be used, reducing material consumption, fabrication costs and time.

Other methods, such as thermochromicity and liquid crystals, are either unable to be controlled electrically or require much higher voltages and power to induce the changes.

According to an aspect of an embodiment, an optoelectronic device includes: a substrate; an electrode member located or disposed on the substrate, wherein the electrode member comprises a first electrode and a second electrode; an active layer located between the first electrode and the second electrode; and an ionic liquid covering the active layer.

The active layer may include a chalcogenide nanoplate.

The chalcogenide nanoplate may include at least one material selected from $Bi_2Se_3$, $MoSe_2$, GaSe, $MoS_2$, $WSe_2$, $WS_2$, $Bi_2Te_3$, ZnSe, InSe, $In_2Se_3$, and $ReS_2$.

The active layer may include a two-dimensional (2D) layered structure material.

The 2D layered structure material may include at least one material selected from $Bi_2Se_3$, $MoSe_2$, black phosphorus, ZnO, GaAs, Si and Ge.

A thickness of the active layer may be about 20 nm or less.

The ionic liquid may include at least one material selected from [DEME][TFSI], [DEME][BF4], [EMIM]-[BF4],

[BMIM][BF4], [BMIM][TFSI], [TMPA][BF4], [DEME][FSI], and [EMIM][FSI].

The optoelectronic device may further include a power source coupled with the electrode member, wherein the power source modulates an optical property of the optoelectronic device. For example, application of a voltage to the electrode member by the power source modulates an optical property of the optoelectronic device.

The power source may apply a voltage of −3 V to 3 V to the electrode member so as to modulate transparency of the optoelectronic device.

The first electrode may be electrically isolated from, or electrically isolated from, the active layer.

The substrate may include at least one material selected from glass, sapphire, quartz, silicon dioxide, silicon nitride, gallium nitride, plastics, boron nitride, ITO, AZO, IZO, FTO, CdO, CdZnO, CdNiO, PEDOT, and graphene.

The electrode member may further include a third electrode disposed on the substrate.

The first electrode may be electrically isolated from, or electrically isolated from, the active layer and function as a gate, the second electrode may be electrically connected with the active layer and function as a drain electrode, and the third electrode may be electrically connected with the active layer and function as a source electrode.

The third electrode may be located or disposed on the same surface of the substrate with the first electrode and the second electrode.

The optoelectronic device may further include a protection layer covering the optoelectronic device.

The ionic liquid may be encapsulated by the protection layer.

The ionic liquid may cover the active layer. Foe example, theionic liquid may have been applied by a spin coating method or a pipette method.

The active layer may have a shape of a square, a circle, a triangle, an ellipse, a rectangle, a hexagon, or other type of polygon.

According to an aspect of another embodiment, a smart window includes: a plurality of optoelectronic devices described above; and a power source coupled with the plurality of optoelectronic devices, wherein the power source modulates optical properties of the plurality of optoelectronic devices.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1A shows an optical image of the $Bi_2Se_3$ nanoplates on a glass substrate; FIG. 1B shows an atomic force microscopy (AFM) image of the $Bi_2Se_3$ nanoplates; FIG. 1C shows a line profile across the AFM image, which shows a clear value of around 12 nm for the nanoplate thickness. FIG. 1D shows SEM-EDS mapping of Se element distribution in $Bi_2Se_3$ nanoplates.

FIG. 2A illustrates visible transparency modulation of $Bi_2Se_3$ nanoplates using EDLG. A Schematic diagram of electron accumulation in EDLTs. The electric double-layer transistor geometry was operated using the IL for gate modulation. The electric charge accumulation results in an electric field at the interface, which can be used to tune the density of electrons in the surface-electron-accumulation layer at the surface of the $Bi_2Se_3$ samples. FIG. 2B is graph of optical transmission spectra of $Bi_2Se_3$ nanoplates between 400-900nm under the applied EDL gate voltage. The transmission spectra show a higher transmission value at long wavelengths than at shorter wavelengths. The spectra elucidate the widening and lessening of the optical bandgap after the applied positive and negative EDL gate voltage. FIG. 2C shows optical transmission images of the $Bi_2Se_3$ nanoplates with thickness around 15 nm under the applied EDL gating (EDLG). The observed results clearly demonstrate optical modulation behaviour in layered structure $Bi_2Se_3$ nanoplates via EDL gating.

FIG. 3A to 3C shows infrared reflection and transmission of $Bi_2Se_3$ under EDLG. FIG. 3A shows optical transmission spectra of $Bi_2Se_3$ nanoplates via the EDL gating modulation. FIG. 3B shows reflection spectra of $Bi_2Se_3$ nanoplates via the EDL gating modulation. The modulated spectra at near-infrared regions exhibits a tunable reflection window, due to the simultaneous modulation of the absorption edge and the electron plasma edge of the nanoplates via the applied EDL gate voltage. FIG. 3C shows band structure of $Bi_2Se_3$ nanoplates under positively biased (top) zero-biased (middle), and negatively biased (bottom) EDL gating modulation, based on first-principles density functional theory calculations. The dashed lines indicate the positions of the Fermi levels.

FIG. 4A shows transmission values of a $Bi_2Se_3$ nanoplate as functions of the EDLG voltage at the short wavelength of $\lambda=1.5$ μm and the long wavelength of $\lambda=3.5$ μm. FIG. 4B shows reflection values of a $Bi_2Se_3$ nanoplate as functions of the EDLG voltage at the short wavelength of $\lambda=1.5$ μm and the long wavelength of $\lambda=3.5$ μm. FIG. 4C shows plasma frequency extracted from the experimental results based on the Drude model. FIG. 4D shows experimentally measured onsets of absorption (maximum transmission value) and calculated direct optical transition energies near the Fermi level (effective bandgap) as functions of the EDLG voltage. The empty circles are the experimentally measured onsets of absorption and the solid circles (shaded) are calculated direct optical transition energies near the gate controlled Fermi level. The increasing effective bandgap is consistent with the observed blue shift of the transmission maximum position.

FIG. 5A shows optical transmission spectra of $MoSe_2$ flakes under the applied positive EDL gating modulation. FIG. 5B shows optical transmission spectra of $MoSe_2$ flakes under the applied negative EDL gating modulation. The modulated spectra at near-infrared regions exhibits a similar tuneable transmission window as the layered structure $Bi_2Se_3$ nanoplates, due to the coincident modulation of the absorption edge and the electron and hole plasma edges. FIG. 5C shows band structure of $MoSe_2$ few layer flakes under positively biased (top) zero-biased (middle), and negatively biased (bottom) EDL gating modulation, based on first-principles density functional theory calculations. The dashed lines indicate the positions of Fermi levels.

FIG. 6A shows transport characteristics ($I_{DS}$-$V_G$) of the $Bi_2Se_3$ nanoplates via the EDL gating effect. FIG. 6B shows transport characteristics ($I_{DS}$-$V_G$) of the $MoSe_2$ flakes via the EDL gating effect. Compared to $MoSe_2$ flakes, the charge transport behaviour indicates a heavily n-doped nature of $Bi_2Se_3$ nanoplates, such that the Fermi level cannot move into its valence band. The arrows show the direction of the applied voltage sweeps.

FIG. 7A to 7B shows line profile across the AFM image, which shows a clear value of around 12 nm and 22 nm for the two nanoplate thickness. Scale bar is 10 µm.

FIG. 8A shows raman spectrum of FQLs $Bi_2Se_3$ nanoplates in the 10-450 $cm^{-1}$ region. FIG. 8B shows raman spectrum of FQLs $MoSe_2$ flakes in the 10-450 $cm^{-1}$ region. The corresponding peak locations are consistent with the reported Raman spectrum of $Bi_2Se_3$ nanoplates and other layered structure nanomaterials.

FIG. 12A shows transfer characteristics ($I_{DS}$-$V_G$) of the $Bi_2Se_3$ nanoplates via IL ([DEME]-[TFSI]) gating effect. FIG. 12B shows transfer characteristics ($I_{DS}$-$V_G$) of the $Bi_2Se_3$ nanoplates via IL ([EMIM]-[BF4]) gating effect.

FIG. 13A: $Bi_2Se_3$ nanoplate on a glass substrate. FIG. 13B: Device after photolithography process, showing the outlines of the gate, source, and drain. FIG. 13C: Higher magnification image showing the outline of the device after photolithography on the nanoplate. FIG. 13D: Gold electrodes of the device on the $Bi_2Se_3$ plate, deposited using electron beam deposition. The device configurations were typically 50 µm wide and 30 µm long.

DETAILED DESCRIPTION

Figure 1A:
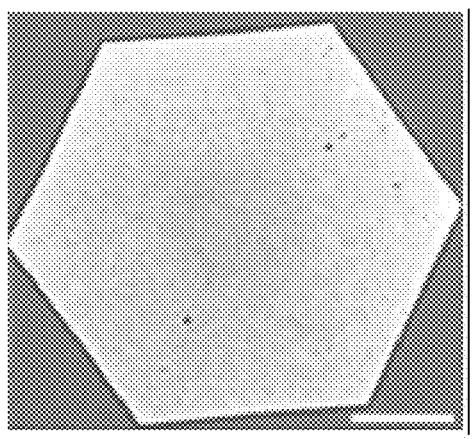
FIG. 1A to 1D are drawings of nanoplate and optical device comprising nanoplate.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the FIG.s, to explain aspects thereof. Expressions such as "at least one of," when preceding a list of elements, modify the entire list of elements and do not modify the individual elements of the list. An expression used in the singular may encompass the expression in the plural.

A detailed description of an optical modulator including a nanostructure will be presented below with reference to the drawings. A size of each component in the drawings may be exaggerated for the sake of convenience. In addition, the exemplary embodiments described below are merely illustrative only, and various modifications therefrom may be possible.

In addition, with regard to a layer structure described below, terms such as "above" and "on" may indicate that an element is not only directly on another element with a contact therebetween but also over or below another element without any contact therebetween.

The various embodiments are advantageously utilized in applications such as wide spectral range optical modulators and large-area electrically controlled smart windows. The possible commercial applications of such smart windows include displays for smart watches and cell phones (a constant electrical charge can maintain a transparent state), light filters, and photoelectric data storage (electrically modulated transparent ('0') to opaque ('1') state). Other applications also include aerospace and privacy mirrors.

There are many different kinds of ionic liquids available, many of which can be used for this technique. Examples include N-diethyl-N-(2-methoxyethyl)-N-methylammonium bis-(trifluoromethylsulfonyl)-imide (DEME][TFSI], [DEME][BF4], [EMIM]-[BF4], [BMIM][BF4], [BMIM][TFSI], [TMPA][BF4], [DEME][FSI], [EMIM][FSI],etc). The choice of active materials is also not critical.

According to an embodiment, an optoelectronic device is provided that typically includes source, drain and gate electrodes on a substrate, a two-dimensional (2D) layered structure material on said substrate and located between said source, drain and gate electrodes, or a thin film semiconductor on said substrate and located between said source, drain and gate electrodes, and an ionic liquid (IL) covering the 2D layered structure material or the thin film semiconductor. In certain aspects, the 2D layered structure material includes a layered metal chalcogenide nanoplate. In certain aspects, the layered metal chalcogenide nanoplate includes a $Bi_2Se_3$ nanoplate.

In certain aspects, the 2D layered structure material comprises a material such as a metal chalcogenide (e.g., $Bi_2Se_3$, $MoSe_2$, GaSe, $MoS_2$, $WSe_2$, $WS_2$, $Bi_2Te_3$, ZnSe, InSe, $In_2Se_3$, $ReS_2$, alloys of previously mentioned materials, etc.), a 2D layered structure material with a bandgap (e.g., black phosphorus, etc.), or other material(s) that can be grown with adequate thickness and flatness (e.g., ZnO, GaAs, Ge, etc.).

In certain aspects, the IL comprises N-diethyl-N-(2-methoxyethyl)-N-methylammonium bis-(trifluoromethyl-sulfonyl)-imide.

In certain aspects, the device further includes a power source coupled with the electrodes, wherein application of a voltage modulates an optical property of the device. In certain aspects, the optical property is one of opacity or transmissivity of the device.

In certain aspects, the source, gate and drain electrodes each comprise a conductive material such as Au, Ag, Al, Cu, Pd, Pt, Ti, Fe, W, other inert metals, ITO, AZO, IZO, FTO, CdO, CdZnO, CdNiO, PEDOT, graphene, or other transparent conductors.

In certain aspects, the substrate comprises a transparent or semi-transparent material such as glass, sapphire, quartz, silicon dioxide, silicon nitride, gallium nitride, plastics, boron nitride, $SiO_2$ on Si, other electrically insulating materials, Si, ITO, AZO, IZO, FTO, CdO, CdZnO, CdNiO, PEDOT, graphene, or other transparent conductors.

According to another embodiment, a method of changing an optical property of the optoelectronic device is provided. The method typically includes applying a voltage signal to the electrodes to change an optical response of the device to incident light having a certain wavelength or a certain range of wavelengths.

The emergence of two-dimensional (2D) layered structure materials beyond graphene has opened new scenarios in the exploration of low-dimensional electronic systems. These materials, such as hexagonal-boron nitride (h-BN) and transition metal dichalcogenides (TMDCs), are formed from weak van der Waals interaction between layers and strong covalent bonding within each layer. The rich spectrum of properties in 2D layered structure crystals has created exciting prospects for potential applications in valleytronics, nonlinear optics, sensing, and transparent electrodes. Bismuth selenide ($Bi_2Se_3$), one of these layered 2D layered structure materials, has been shown to be a topological insulator (TI), characterized by its band insulator behavior in the bulk and gapless linear energy dispersion relationship at the sample boundary that is a result of unbroken time-reversal symmetry. Recently, some research groups have reported that the optoelectronic properties in $Bi_2Se_3$ can be modified via bulk doping, intercalation, and surface deposits. The dramatic changes in $Bi_2Se_3$ optical properties have attracted particular interest in this material system. However, such processes have to be done in the material preparation stage and the material's optical properties cannot be changed once an optical device has been made. Dynamic electrical control of the optical properties of layered metal chalcogenides in the visible spectrum has not been reported yet. This is attributed to the difficulty of tuning the Fermi Level and carrier density of the chalcogenides over a wide range via traditional electrical gating approaches.

To overcome these obstacles, according to certain embodiments, electric-double-layer (EDL) gating techniques at room temperature are used to dynamically tune the optical properties in 2D layered structure materials from infrared to visible wavelengths. The dynamic optical modulation induced by the EDL gating can be used in applications that would not be suitable for the intercalation technique, including wide spectral range optical modulators and large-area electrically controlled smart windows. Because the gating technique is electrically controlled, the devices can easily be controlled using a light sensor and a battery source.

Here, the layered structure material applicable to the devices means "materials with natural two dimensional layer structures or materials that can be made into ultrathin (several to tens of nanometers) layers." Examples include bismuth selenide, molybdenum disulfide and even silicon.

EDL gating using ionic liquids (ILs) or ionic gels, the solidified versions of ionic liquids, as the gate dielectric can efficiently tune the electronic states and the Fermi energy ($E_F$) of semiconductors over a wide range. Compared to using oxide dielectrics, this technique offers lower-power, higher-mobility, faster-switching, and larger carrier concentration tuning. When a gate voltage ($V_G$) is applied to the electrodes, an electric double layer (EDL) is generated at the liquid/solid (L/S) interface after the ionic redistribution, creating a large capacitance caused by nanogap capacitors. The capacitance of the EDLs exceeds 10 $\mu F/cm^2$, meaning that it can deplete or accumulate larger quantities of charge carriers at the surface of the sample more effectively than an oxide dielectric FET under the same $V_G$. This improvement can lead to advancements in electrostatic modulation of interfacial electronic states, such as electric-field-induced superconductivity in ZrNCl and $SrTiO_3$. The unprecedented gating power of ionic liquids enables dynamic enhancement and reduction of optical transmission through $Bi_2Se_3$ nanoplates by applying positive and negative gate voltages, respectively, which will be shown in the following sections. Similar dynamic tuning of optical properties was also observed in other layered-structured TMDC materials, such as $MoSe_2$. The lightly doped $MoSe_2$, in contrast to the $Bi_2Se_3$, shows an optical tuning behavior regardless of the sign of the gate voltage, which is consistent with its ambipolar electrical properties. The observation indicates that the IL gating (EDLG) technique not only provides a powerful method for modulating the electronic transport and other physical properties in materials such as $Bi_2Se_3$, but also simplifies device fabrication and reduces energy consumption. The unique EDL gating mechanism based on ion migration and EDL formation allows the gate electrode to be far away from the gated material, which completely removes the light-blocking metal gate that would normally be above the material in traditional gate configurations and provides advantages for optical measurements and photonic device designs.

Material Preparation and Characterization

Figure 1B:
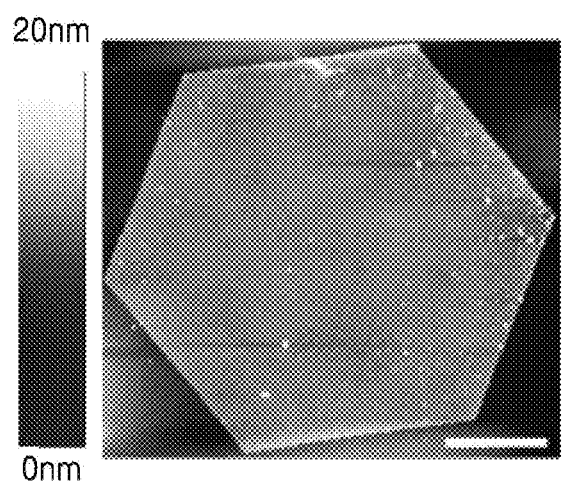
Figure 1C:
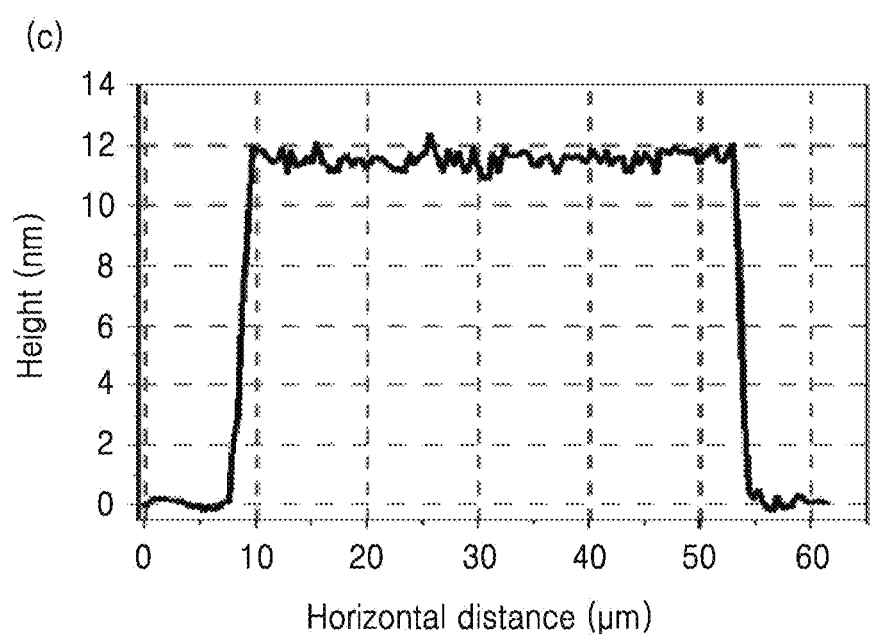
Figure 1D:
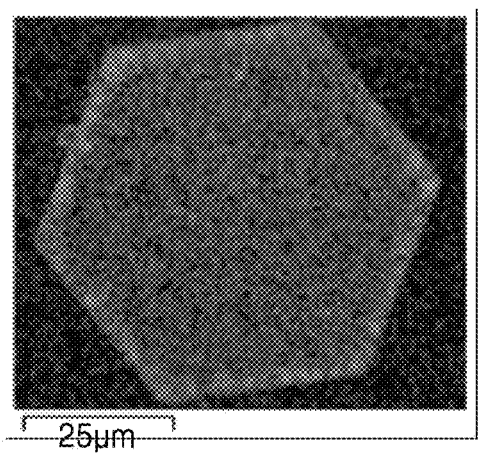
Figure 1E:
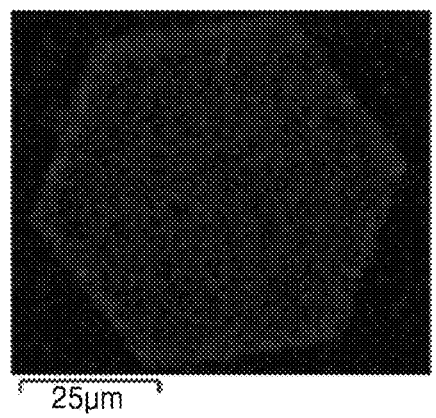
FIG. 1E shows SEM-EDS mapping of Bi element distribution in $Bi_2Se_3$ nanoplates.
Figure 7A:
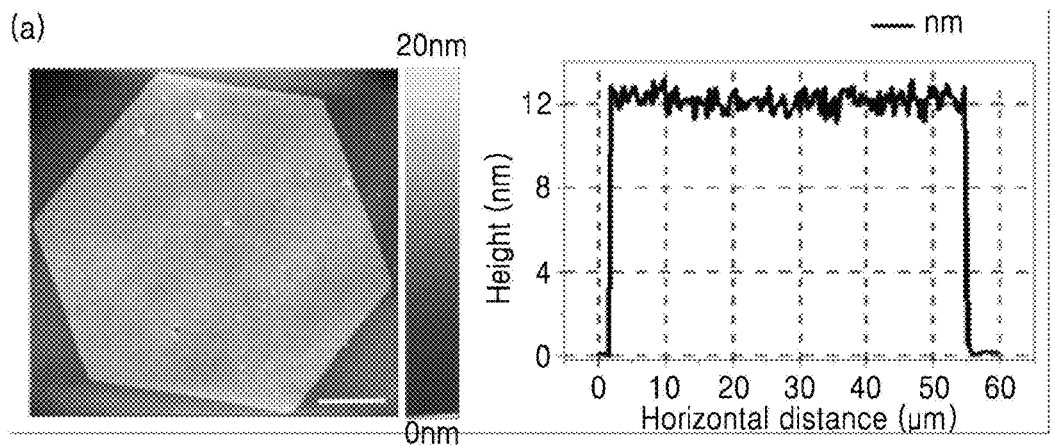
FIG. 7A to 7B shows atomic force microscopy (AFM) images of the $Bi_2Se_3$ nanoplates.
Figure 7B:
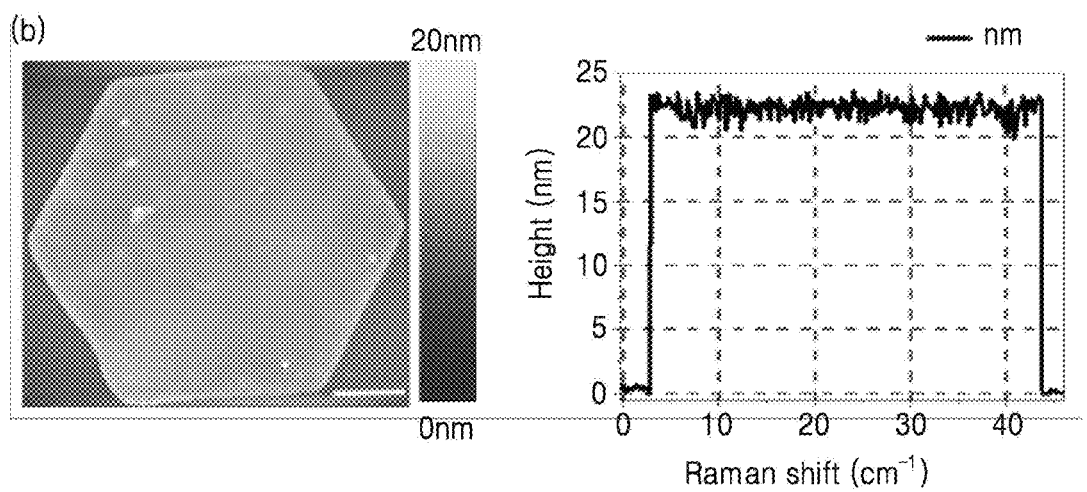

In certain embodiments, 2D nanoplates are synthesized using solvothermal synthesis. For example, in one embodiment, a $Bi_2Se_3$ nanoplate is synthesized using solvothermal synthesis. The thickness of the nanoplates may range from several to tens of nanometers (nm). Their lateral dimensions may go up to 80μm (or greater), which is larger than other reported results from solvothermal synthesis and provides a good platform for optical study. An optical image of a typical $Bi_2Se_3$ nanoplate on a glass substrate is shown in FIG. 1A. The lateral size of the nanoplate is around 50μm. Its thickness was measured using atomic force microscopy (AFM) as shown in FIG. 1B. FIG. 1C shows a line profile of the nanoplate from FIG. 1B and indicates that the thickness of the nanoplate is around 11nm. AFM results of multiple nanoplates with different thicknesses are shown in FIG. 7A to 7B. To confirm the identity of the grown nanoplates, Raman spectroscopy was carried out (FIG. 8). The three clear characteristic peaks located at ~71 $cm^{-1}$, ~131 $cm^{-1}$ and ~173 $cm^{-1}$ are in excellent agreement with the reported Raman spectrum of $Bi_2Se_3$ [see, Zhang, J., et al. Raman Spectroscopy of Few-Quintuple Layer Topological Insulator $Bi_2Se_3$ Nanoplatelets. Nano Lett 11, 2407-2414 (2011).]. To better identify the elements of the $Bi_2Se_3$ nanoplates, scanning electron microscope-energy dispersive X-ray spectroscopy (SEM-EDS) element mapping of $Bi_2Se_3$ nanoplates was performed and is shown in FIG. 1D (Se) and FIG. 1E (Bi). The electron diffraction results (shown in FIG. 9B) further demonstrates the single crystalline nature of the nanoplates.

Figure 1F:
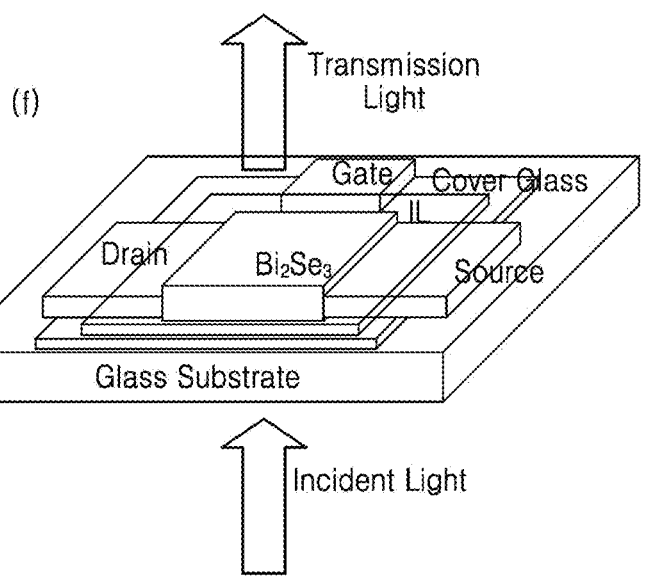
FIG. 1F shows an optical device configuration using IL for gate modulation, wherein a gate voltage is applied between a gold gate electrode and the $Bi_2Se_3$ nanoplate, and the arrow indicates the propagation direction of light though the device. Scale bar is 10 μm.
Figure 2A:
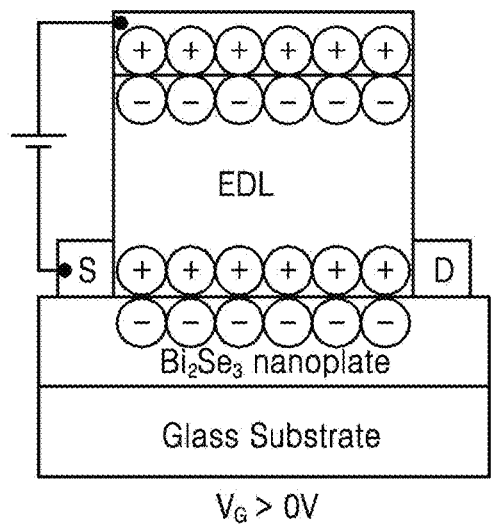
FIG. 2A to 2C are drawings of optical device comprising $Bi_2Se_3$ nanoplates.

To show the optical modulation in $Bi_2Se_3$ nanoplates controlled with EDL gating, optical spectral measurements were carried out to characterize individual nanoplates with and without IL gating. FIG. 1F shows a device configuration using EDL for gate modulation according to an embodiment. A voltage is applied between a gold gate electrode and the $Bi_2Se_3$ nanoplate. The cover glass is used to ensure uniform EDL thickness to reduce lensing effects and effects from liquid motion after application. The arrow indicates the propagation direction of light through the device. The IL utilized in this example was N-diethyl-N-(2-methoxyethyl)-N-methylammonium bis-(trifluoromethylsulfonyl)-imide ([DEME]-[TFSI]), an imidazolium-based compound which exhibits rather high ionic conductivity and is widely used in EDL devices. It has a very wide transparent window from visible to mid-IR, which covers the complete frequency range of interest. A droplet of IL was placed on both a gold electrode and a $Bi_2Se_3$ nanoplate with an electrode attached to generate the $Au/IL/Bi_2Se_3/Au$ configuration shown in FIG. 1F. The device dimensions between source and drain electrodes are W=50μm in width and L=30μm in length. It should be appreciated that the device dimensions may vary; for example, the device length may range from 100 nanometers to up to a meter, while the width can range from tens of nanometers to up to a meter. The device is covered by the IL droplet. Applying the IL as the dielectric for EDL transistors (EDLTs) on the surface of the $Bi_2Se_3$ nanoplates subsequently allows for modulating its electronic states and $E_F$. FIG. 2A shows a schematic diagram of the electron accumulation case in $Bi_2Se_3$ nanoplates. As shown in FIG. 2A, when a positive gate voltage is applied, electrons will accumulate at the nanoplate's interface with the IL. An EDL will then form at the interface and the corresponding Fermi level will rise. A negative gate voltage, on the other hand, will lower the Fermi level in the gated material.

Figure 2B:
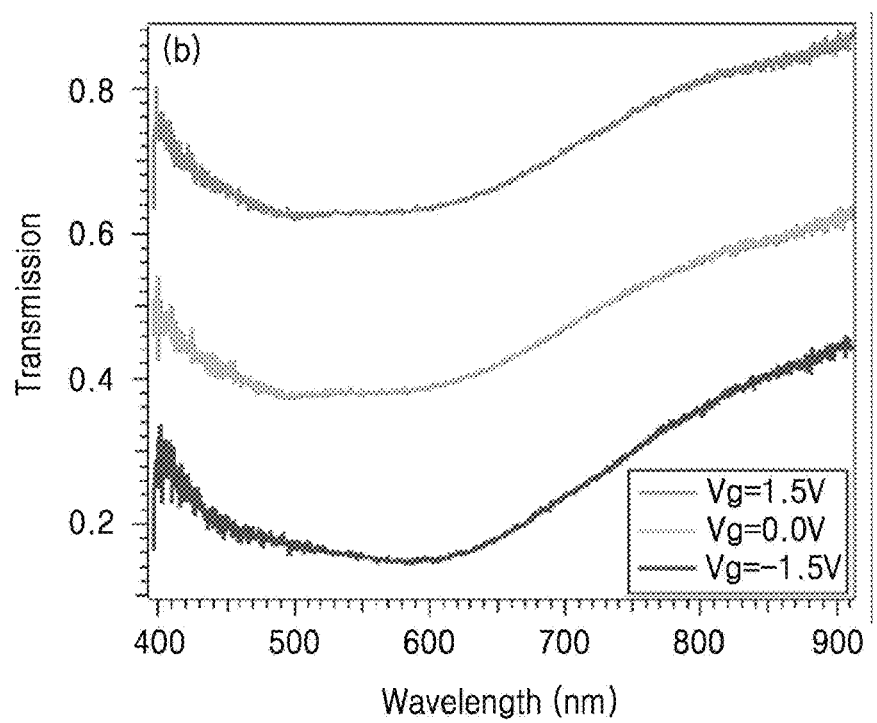
Figure 2C:
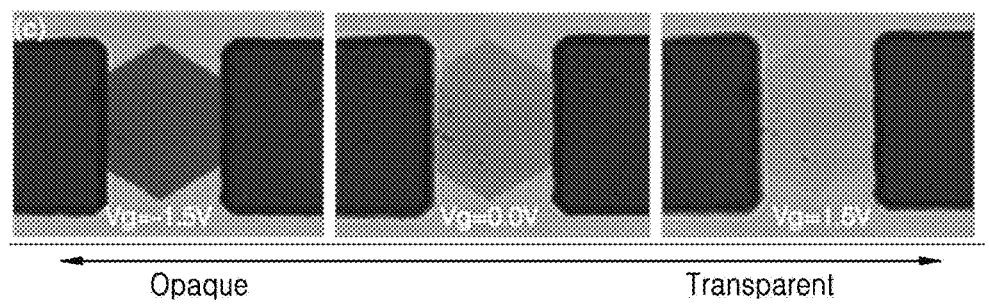

EDL gating impacts the optical response of $Bi_2Se_3$ even in the visible frequency range. FIG. 2B shows the transmission spectra of $Bi_2Se_3$ nanoplates with and without EDL gating between 400-900 nm. Without an applied gate voltage, the optical transmission is relatively low for the device, about 40%. In contrast, the transmission increases dramatically for all visible wavelengths when positive gate voltages are applied. For example, at a gate voltage of 1.5 V, the transmission increases to around 70% in most of the visible range, meaning that $Bi_2Se_3$ nanoplates become much more transparent. On the other hand, when a negative gate voltage is applied, the $Bi_2Se_3$ nanoplates become highly opaque. The transmission decreases to around 20% in most of the visible range after applying a gate voltage of −1.5 V. FIG. 2C shows transmission mode optical images of $Bi_2Se_3$ nanoplates under the applied EDLG with thicknesses around 15 nm. The observed results clearly demonstrate the optical modulation behavior in $Bi_2Se_3$ nanoplates via EDLG. Moreover, the transmission increases as the wavelength becomes longer (FIG. 2B). Such a trend continues all the way to near infrared wavelengths, providing a clear signature of an absorption edge. Below, experimental evidence is provided to elucidate the mechanism of the drastic optical modulation behavior in metal chalcogenide nanoplates with EDL gating.

Analysis and Discussion

Figure 3A:
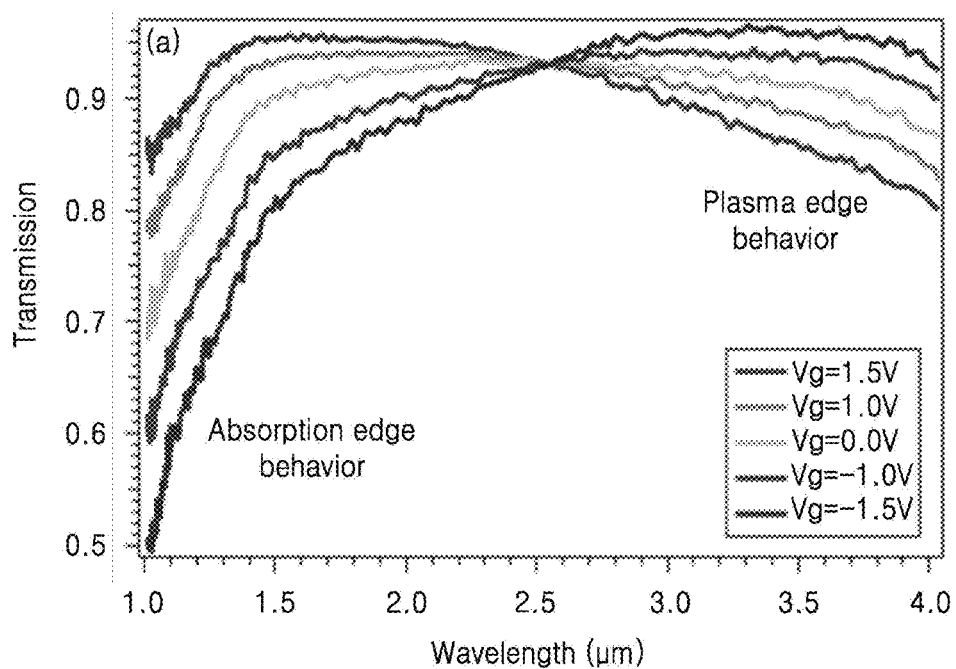
Figure 3B:
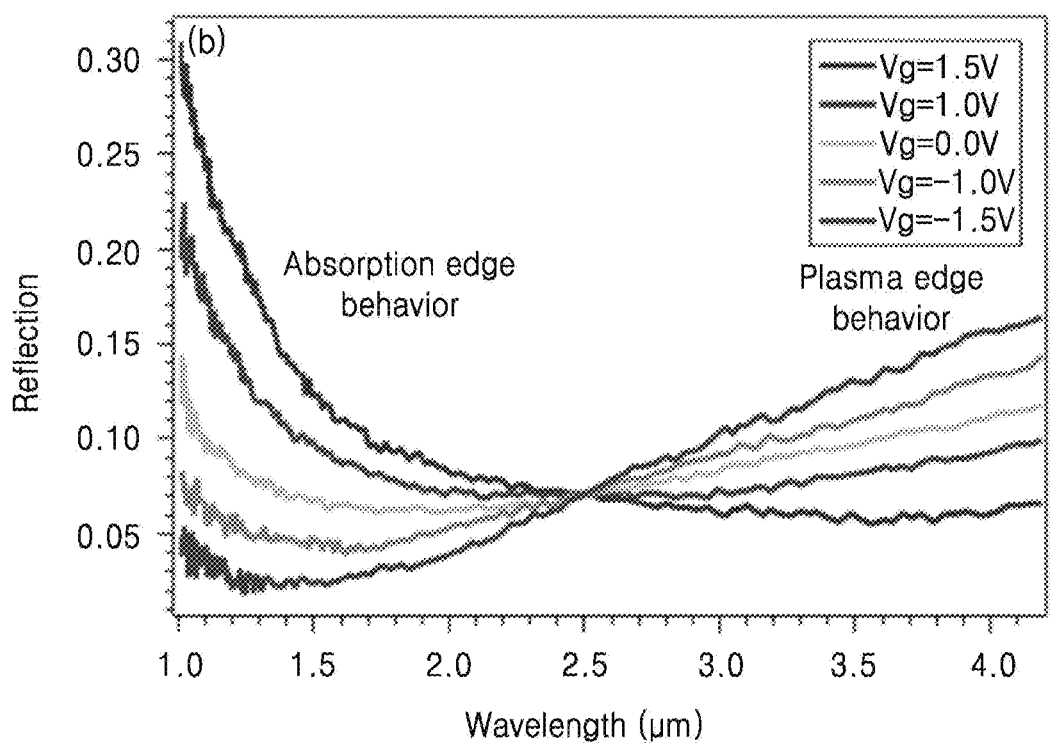
Figure 4A:
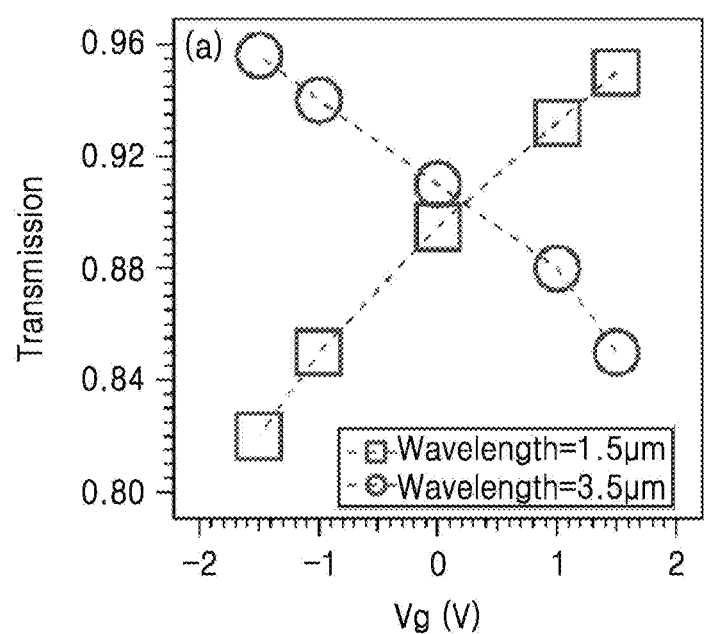
FIG. 4A to 4D shows the optical properties of $Bi_2Se_3$ nanoplates as functions of EDLG voltage.
Figure 4B:
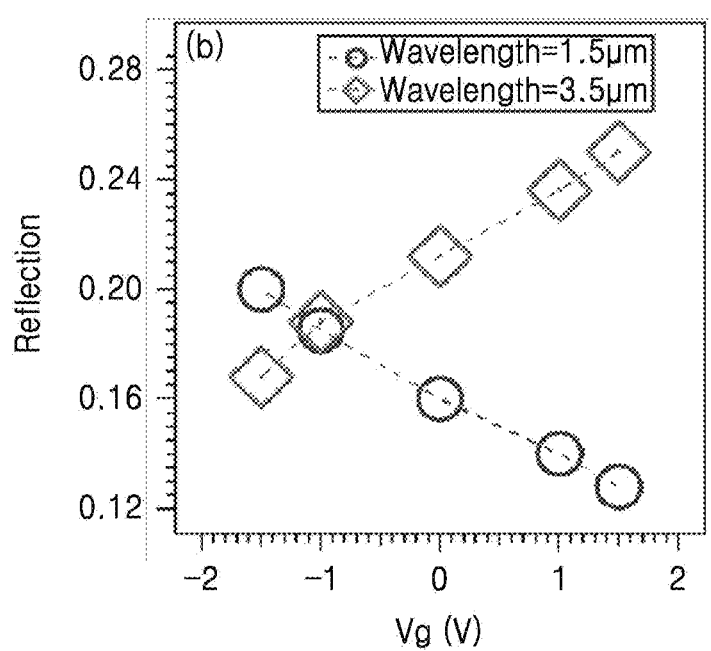

An advantageous feature of the various embodiments is that the free carriers induced by the EDL gating modify the conductivity of the materials, which also significantly alters their optical properties. FIGS. 3A and 3B show the transmission and reflection spectra of a $Bi_2Se_3$ nanoplate under EDL gating in the near-infrared range. In the optical spectrum, the short wavelength (i.e. λ<2.5 μm) absorption edge cut-off corresponds to the fundamental optical gap of the $Bi_2Se_3$ nanoplates and the long wavelength (i.e. λ>2.5 μm) edge corresponds to the free carrier plasma resonance frequency. To better analyze the experimental results, the transmission and reflection values are plotted as a function of the EDL voltage at the fixed wavelengths of λ=1.5 μm and λ=3.5 μm, as shown in FIGS. 4A and 4B, which show that the optical transmission and reflection values depend strongly on the EDL voltage. The FIG.s also show the contrasting behavior between short wavelength λ=1.5 μm and long wavelength λ=3.5 μm trends. For example, the transmission value increases with increasing EDL voltage at λ=1.5 μm, but at long wavelengths the transmission decreases, indicating that there are two optical processes in effect due to the EDL gating modulation.

These trends can be explained with the Drude model, which makes a direct connection between the optical responses of conducting materials and their electronic states. According to this model, the modulated relative permittivity $\epsilon$ can be written as:

$$\varepsilon = \varepsilon_\infty - \frac{\omega_p^2}{\omega^2 + i\omega\Gamma} = \varepsilon_\infty + \frac{i\omega_p^2\tau}{\omega(1-i\omega\tau)} = \varepsilon_r + i\varepsilon_i = (n+ik)^2, \quad (1)$$

where $\epsilon_\infty$ is the high-frequency dielectric constant, $\Gamma=1/\tau$ is the damping constant of the free electron plasma, and T is the relaxation time of the electrons. The plasma resonance frequency is given by $$\omega_p^2 = \frac{Ne^2}{m^*\varepsilon_0},$$

where N is the free carrier concentration, m* is the effective mass of electrons, and n and k are the optical constants which determine the reflection and absorption spectra of the material.

It is worthwhile to consider the Drude model in Eq. (1) in two limiting cases: low and high frequencies. In the low frequency regime ($\omega\tau\ll 1$), the free carrier term in Eq.(1) shows a $1/\omega$ dependence as $\omega\to 0$, indicating that this term dominates in the low frequency limit and the material is a perfect reflector at low frequencies. However, in the high frequency response limit ($\omega\tau\gg 1$), the $1/\omega^2$ dependence of the free carrier contribution becomes less important, and other mechanisms will dominate. Thus, at the high frequency limit ($\omega\tau\gg 1$), the free carrier contribution can be neglected and the material behaves like a dielectric.

In the present case ($1<\omega\tau<\omega_p\tau$), the free carrier contribution plays an important role in the optical properties of $Bi_2Se_3$. The plasma frequency is the characteristic frequency at which the material changes from a metallic to a dielectric optical response, which occurs at the frequency at which the real part of the relative permittivity vanishes, $Re(\epsilon)=0$. The plasma frequency $$\left(\omega_p^2 = \frac{Ne^2}{m^*\varepsilon_0}\right)$$

is dependent on the free carrier concentration and inversely dependent on the effective mass of the free carriers. The plasma edge of a material refers to the region near its plasma frequency, where its reflectivity increases significantly with increasing incident wavelength. The Drude model predicts that the plasma edge will shift to shorter wavelengths due to a positive EDL modulation of the free carrier concentration.

Figure 4C:
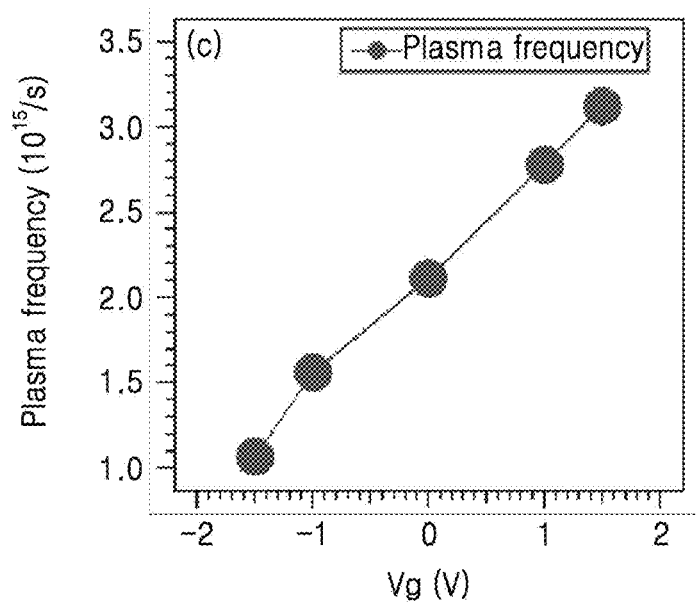
Figure 10A:
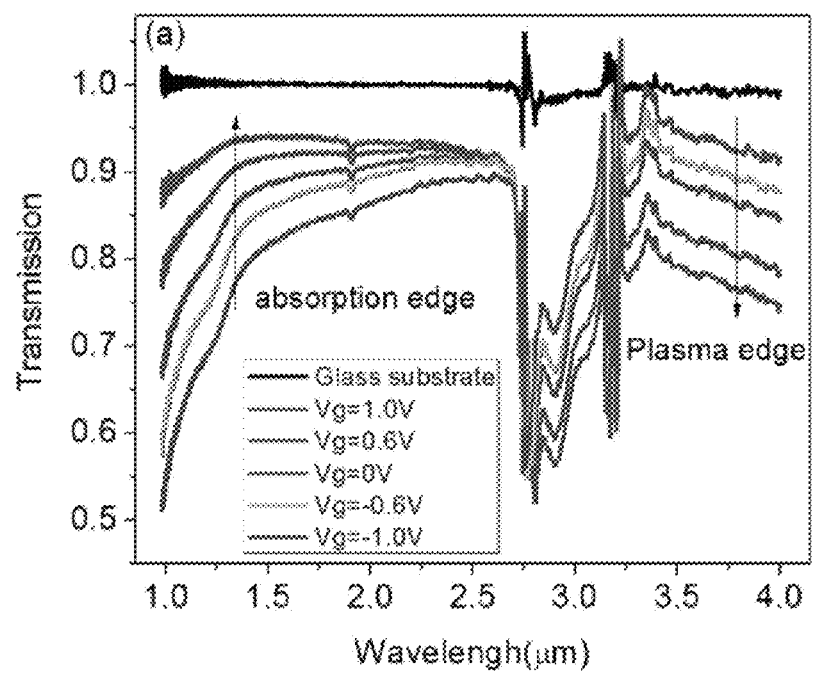
FIG. 10A shows transmission spectra of the $Bi_2Se_3$ nanoplates at near infrared regions with a new IL under positive and negative IL gating bias. The results show a similar behavior (absorption edge at short wavelength and plasma edge at long wavelength) to the data reported in the main text.
Figure 10B:
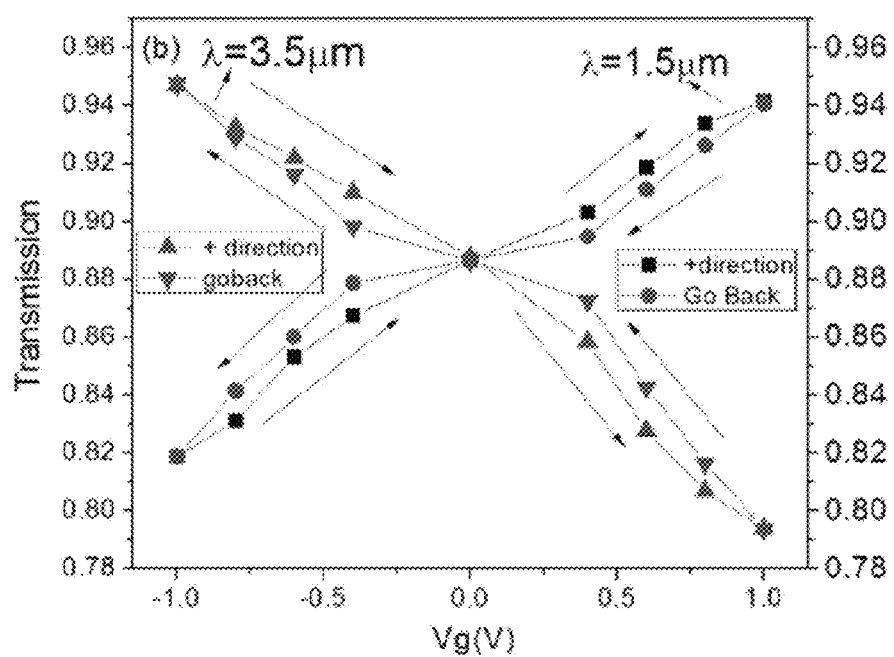
FIG. 10B shows Transmission as a function of the gate voltage at short ($\lambda$=1.5µm) and long ($\lambda$=3.5µm) wavelengths.
Figure 11A:
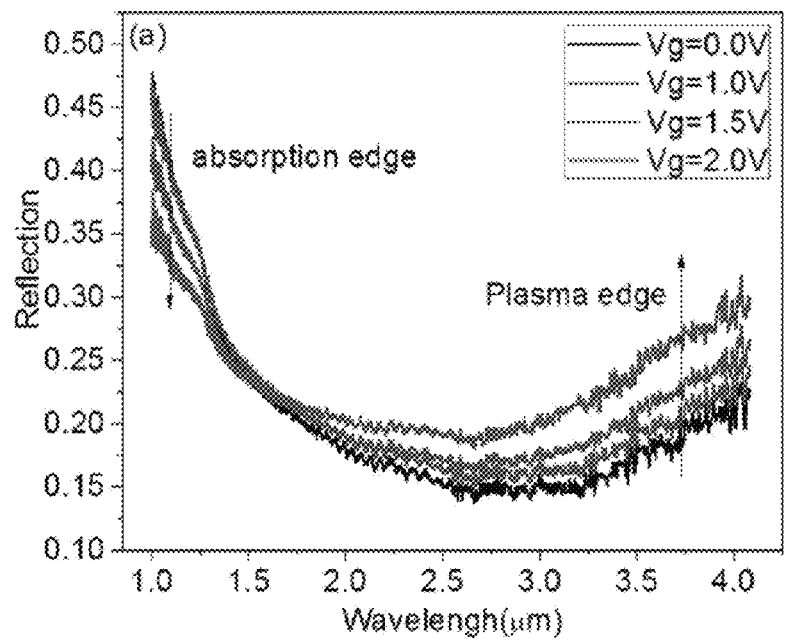
FIGS. 11A and 11B shows reflection spectra of the $MoSe_2$ flakes under the applied positive and negative IL gating effect. The modulated spectra at near-infrared regions clearly demonstrates the similar optical modulation behaviour of the layered structure $Bi_2Se_3$ nanoplates.
Figure 11B:
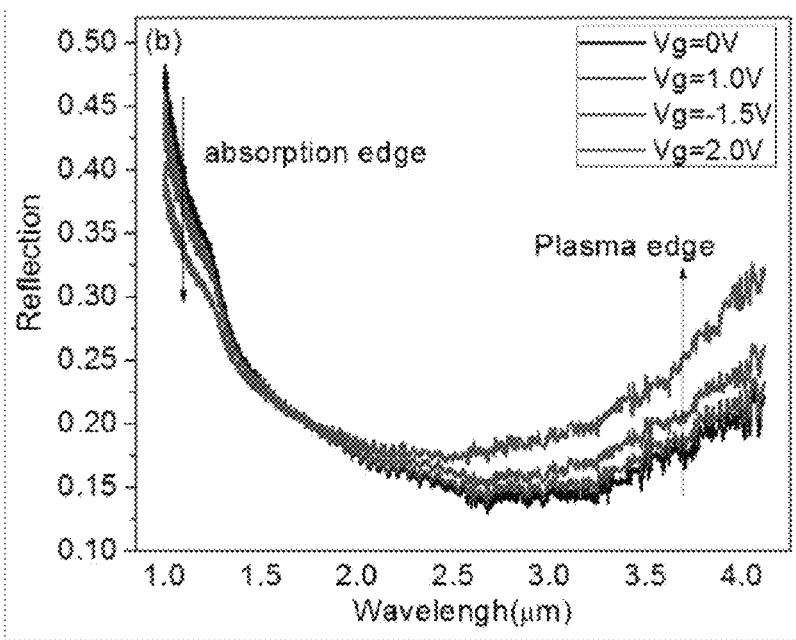

As shown in FIG. 3A to 3C, the reflection and transmission spectra show a substantial blue shift of the plasma edge induced by the positive EDL modulation. Such behavior provides direct evidence of the increasing amount of free electrons inside the materials induced by the EDL, which is consistent with the Drude model described above. The Drude model was applied to the measured results and it was found to perfectly fit with the experimental data at long wavelengths (FIG. 10A, 10B). The value of the plasma frequency can be obtained from the numerical fitting of each curve. As shown in FIG. 4C, the plasma frequency is nonlinearly dependent on the EDL voltage due to free electron concentration and effective mass changes induced by the evolution of the Fermi level within the $Bi_2Se_3$ nanoplates. For example, the plasma frequency reaches a $\omega_p=3.12\times10^{15}/_S$, with best fit parameters $\in_\infty=9.1$ and $\Gamma=2.1\times10^{14}/_S$, at the bias voltage $V_G=1.5V$. The corresponding electron carrier density can be calculated from the plasma frequency, which yields an extremely high free electron concentration on the order of $10^{20}$ cm$^{-3}$. This level of electron concentration modulation is one of the great advantages of using the EDL gating with 2D layered structure material systems. To further study the dynamic optical response of $Bi_2Se_3$ nanoplates under EDL modulation, the relative permittivity ($\in$) of $Bi_2Se_3$ under the bias of the EDL voltage was calculated (seen in FIG. 11A, 11B). Im($\in$) dramatically increases with increasing plasma frequency. This is expected from the Drude model when the carrier density is extremely high. Such behavior further confirms the increasing amount of free electrons induced by the EDL inside the materials.

The second effect of the free carrier density modulation is to significantly shift the absorption edge. The absorption edge originates from the onset of optical transitions across the fundamental band gap of a material, which manifests at short wavelengths as a significant increase in the transmission with increasing incident wavelength. The optical modulation behavior of $Bi_2Se_3$ nanoplates from visible to near infrared is mainly caused by a substantially altered effective optical bandgap, which is a result of the large free electron concentration modulation in the $Bi_2Se_3$ nanoplates via EDL gating. This phenomenon is known as the Burstein-Moss shift. As the electron concentration increases, the Fermi level of the material rises into the conduction band and empty states at the band edge become unavailable. Therefore, optical transitions to the bottom of the conduction band are less likely to occur, resulting in an increased effective bandgap.

Figure 4D:
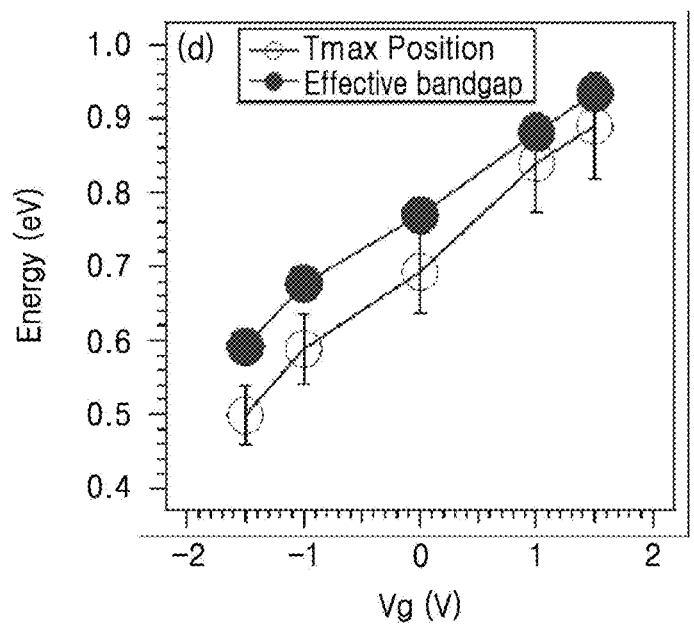

For a quantitative study of the correlation between Fermi level shift and EDL voltage, the electronic structure of $Bi_2Se_3$ was computed using density functional theory (DFT). Assuming EDL gating voltages do not significantly alter the density of states (DOS) shape around the conduction band minimum, the corresponding Fermi level energy was calculated from experimentally derived carrier densities. As shown in FIG. 3C, our calculations estimated an increase of the Fermi level energy by 0.34 eV when the bias changes from −1.5 to 1.5 eV. It can be seen that, when the EDL is unbiased, the Fermi level is located inside the conduction band due to the heavily n-doped nature of the $Bi_2Se_3$ nanoplates (middle panel in FIG. 3C). While the EDL is positively biased, more electrons will accumulate at the $Bi_2Se_3$ nanoplate surface and the increased effective bandgap leads to a blue shift of the absorption edge. A negative bias can lower the Fermi level by reducing the free electron concentration, which frees more low energy optical transitions and shifts the absorption edge to lower energies. This is shown in the near infrared part of the experimental spectra in FIG. 3A and FIG. 3B, providing direct evidence of the optical modulation behavior observed in the experiments. It is noted that the number of lines in the band structure varies due to subband formation. However, previous research confirmed that, based on the density of states (DOS) calculation, the energy separation scale in the subbands is too small to affect the optical measurements (Yao et al.). Measured onset of the absorption as a function of gate voltage is also shown in FIG. 4d. The blue shift of the transmission maximum positions is consistent with the increase in the effective bandgap derived from carrier concentration calculations.

Figure 5A:
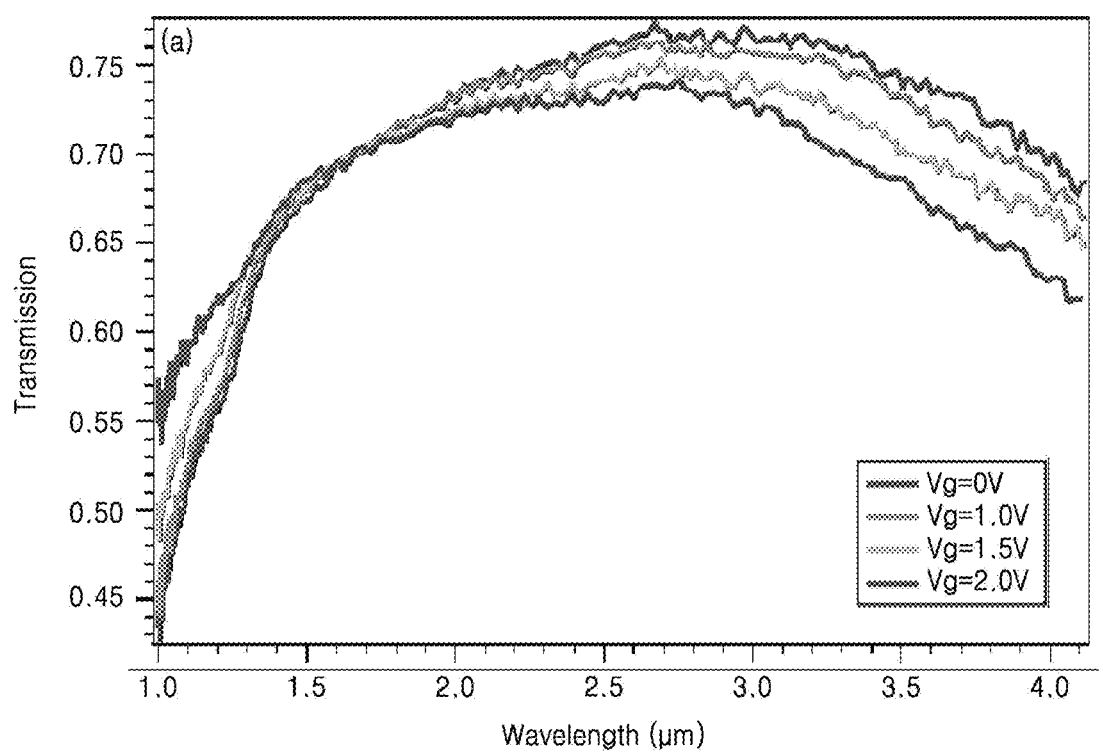
FIG. 5A to 5C shows the infrared transmission of $MoSe_2$ under EDLG.
Figure 5B:
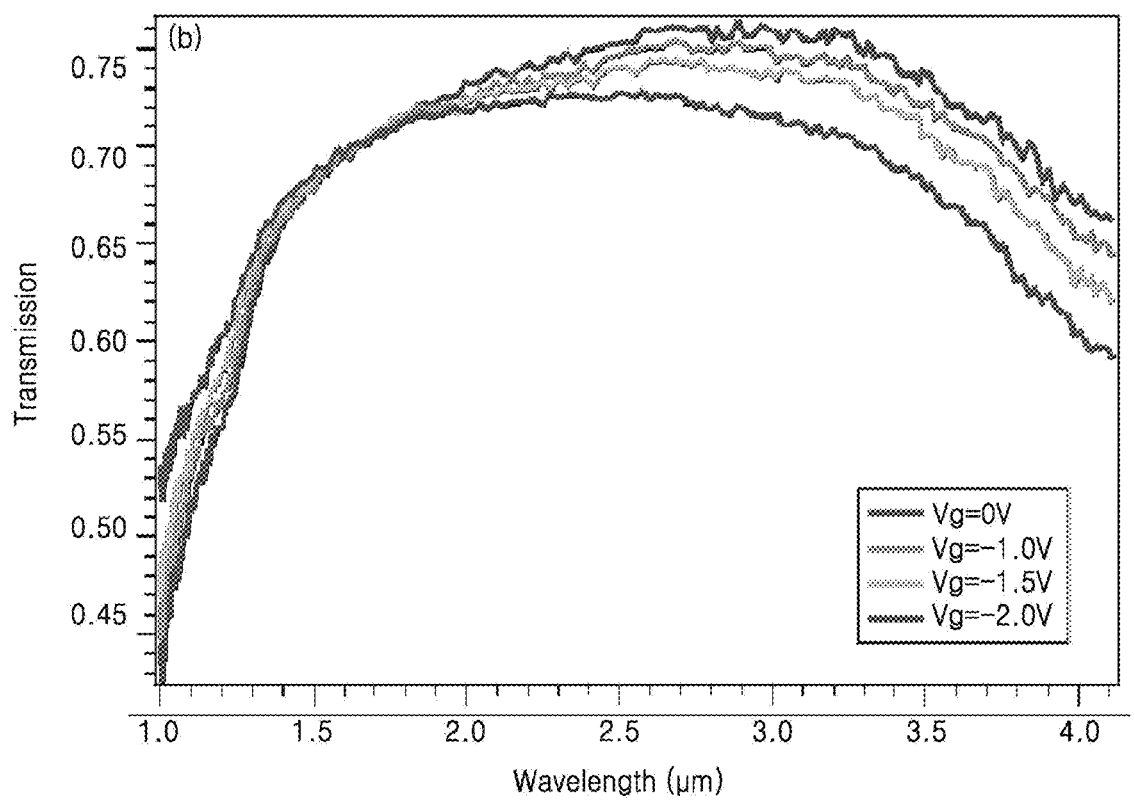
Figure 5C:
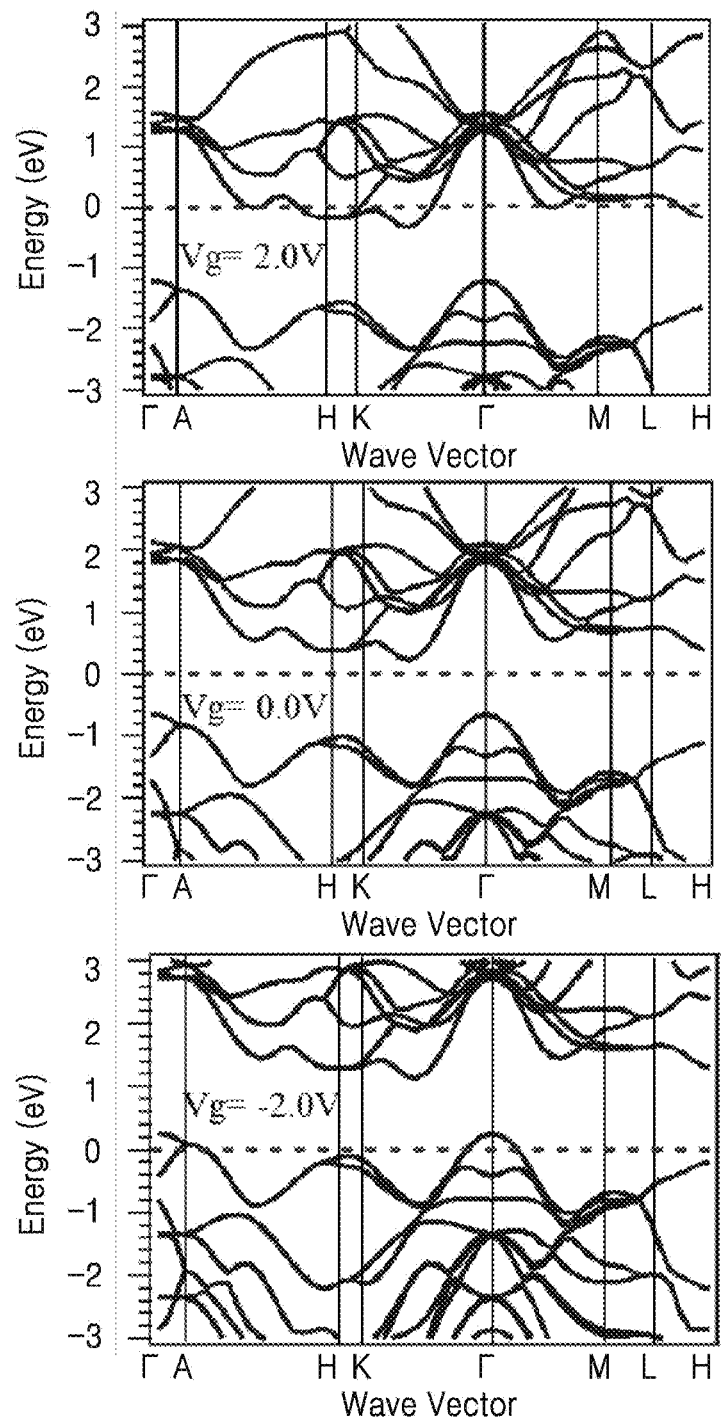

To better demonstrate the universal nature of the EDL technique, similar gating experiments were performed on another layered-structured TMDC material, $MoSe_2$. Dynamic tuning of optical properties was also observed in $MoSe_2$ flakes over similar gating voltages. Modulated transmission spectra of the layered structure $MoSe_2$ flakes (thickness: ~30 nm) in the near-infrared region are shown in FIG. 5A and FIG. 5B with an applied positive and negative voltage, respectively. In contrast to the $Bi_2Se_3$ nanoplates, the Burstein-Moss shift in multilayer $MoSe_2$ involves both electrons (conduction band) and holes (valence band), as illustrated in FIG. 5c. The Fermi level is located in the bandgap for lightly n-doped $MoSe_2$ flakes without any bias (middle panel in FIG. 5c), but lies within the conduction band with a positive gate voltage (top diagram in FIG. 5c). On the other hand, when the gate is negatively biased, holes will accumulate in the $MoSe_2$ flakes. The Fermi level will then lie within the valence band (VB) (bottom panel in FIG. 5c). The increased free electron (hole) density induced by EDL gating results in moving the Fermi level into the conduction (valence) band. In either case, the effective bandgap will be increased, in contrast to the $Bi_2Se_3$ behaviour. The gating induced optical property changes involve the Burstein-Moss shift in either the conduction or valence band, showing a symmetric ambipolar behaviour. The observed results indicate that EDL gating can be used to enhance the free carrier concentration to extremely large values in 2D layered structure material systems without any chemical reactions. Because of the simultaneous shift of the absorption edge at short wavelengths and the electron plasma edge at long wavelengths via the applied EDL gate voltage, the modulated optical responses of both $Bi_2Se_3$ and $MoSe_2$ exhibit a tunable transparent spectral window in the infrared to visible range. Since the Fermi level shifts due to EDL gating are much larger than shifts caused by regular chemical doping, this technique creates intense optical modulation over a large wavelength range, including visible wavelengths, which can be used for applications that require tunable optical properties. Such behaviors can be observed in other ILs as well.

Figure 6A:
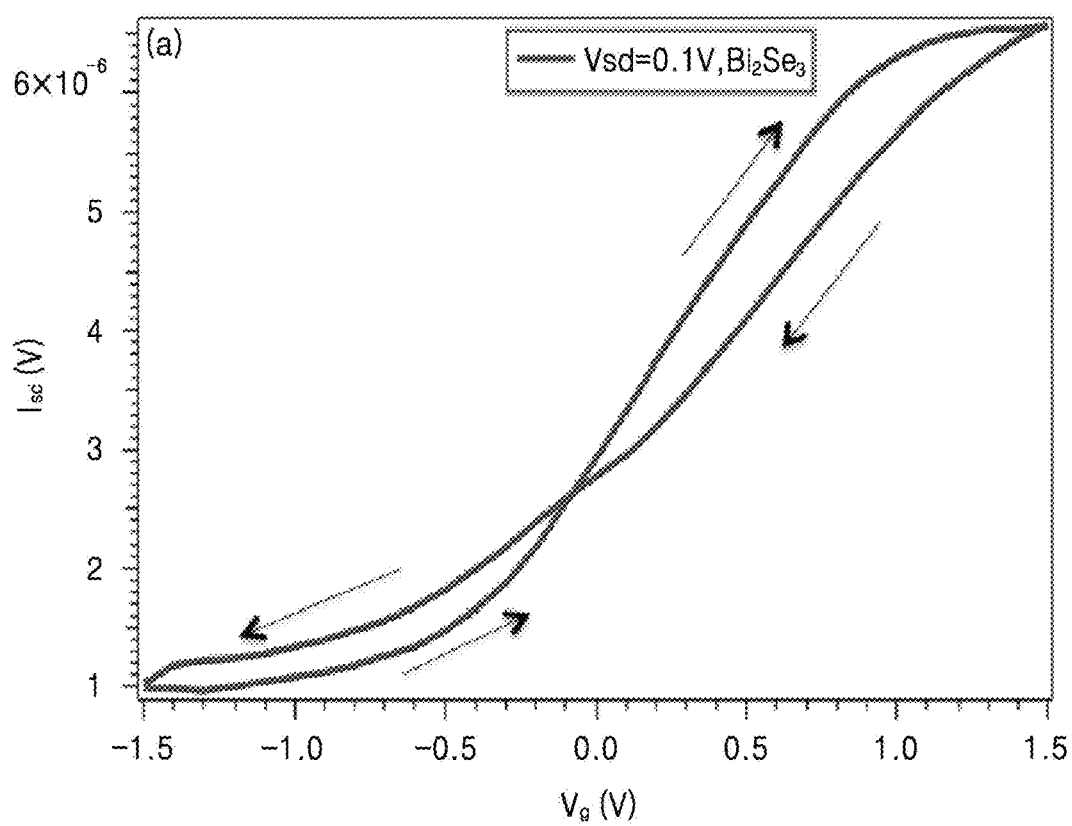
FIG. 6A to 6B shows electronic state change verified by transport measurements.
Figure 6B:
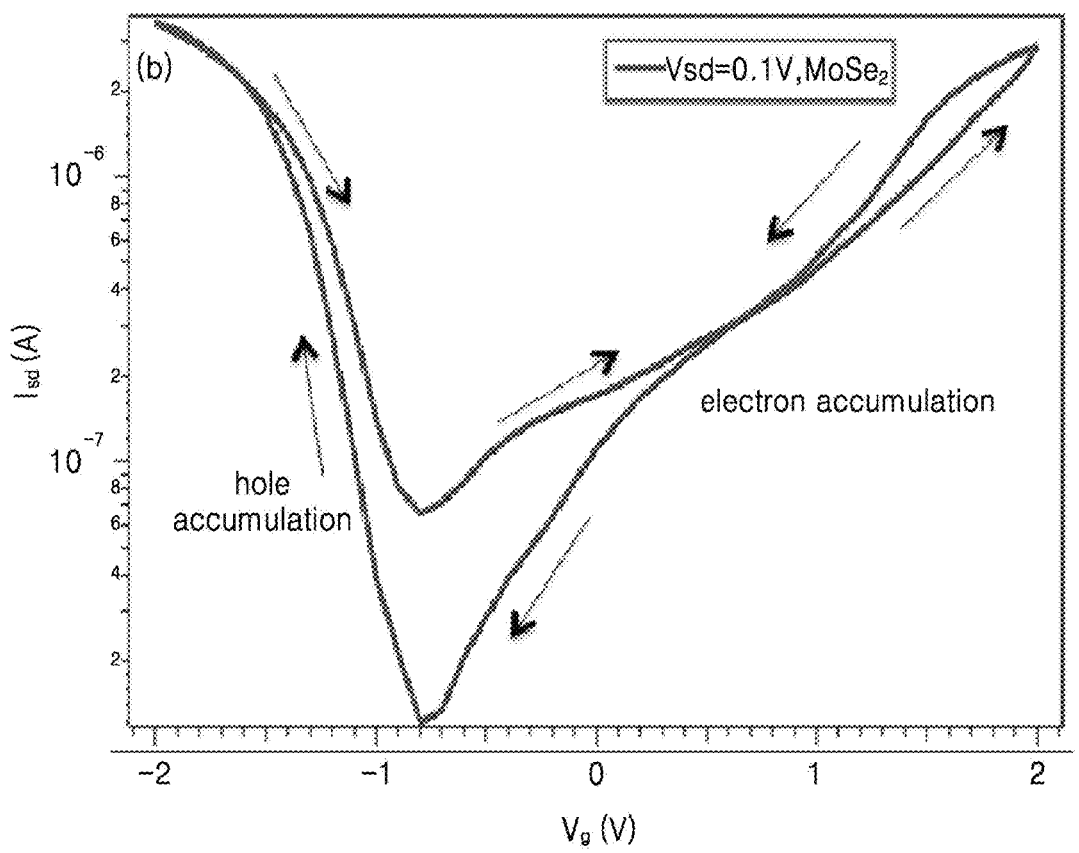
Figure 12A:
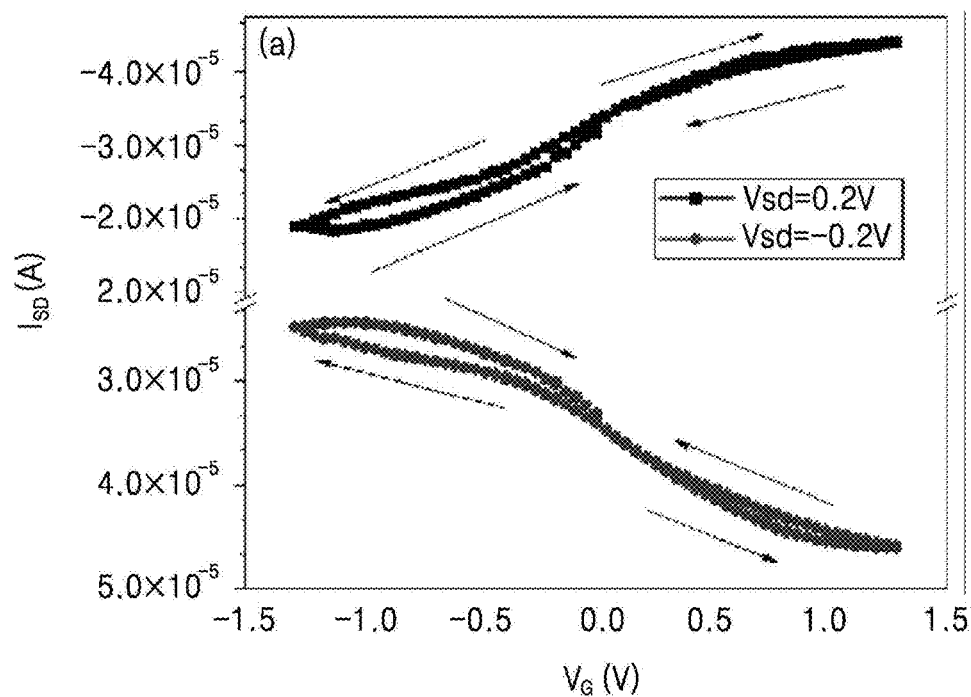
FIG. 12A to 12B shows transfer characteristics ($I_{DS}$-$V_G$) of the $Bi_2Se_3$ nanoplates.

As shown in FIG. 6A, the electronic state changes that cause the above optical effects were also verified by the transport characteristics, i.e. $V_G$ as a function of the source-drain current ($I_{SD}$), of the $Bi_2Se_3$ device with EDL gating at room temperature. With increasing positive $V_G$, the cations in the EDL accumulate at the top of the thin film surface and induce large amounts of electrons at the $Bi_2Se_3$ surface, resulting in an intense increase of the $I_{SD}$ from enhanced electron conduction (Shown in FIG. 6A). Alternatively, on the condition of a negative bias, electrons are depleted in the nanoplate at the interface, meaning that the $I_{SD}$ decreases due to a lower electron concentration. The electric charge accumulation results in an electric field at the interface, which can be used to tune the Fermi level and the density of electrons in the surface-electron-accumulation layer at the surface of the $Bi_2Se_3$ samples. FIG. 6B shows the transfer characteristics of the $MoSe_2$ flakes under EDL gating at room temperature. A typical ambipolar behavior was observed at room temperature, which is consistent with the lightly n-doped nature of $MoSe_2$ flakes. Multiple samples were measured and similar transfer characteristics were found in each sample (FIG. 12), showing high reproducibility.

Dynamic optical modulation of ultrathin $Bi_2Se_3$ nanoplates has been observed. Dramatic transmission and reflection changes are achieved in nanoplates as thin as 10 nm. Such drastic optical property changes are due to widening of the effective optical band gap enabled by tuning of the electronic states and the $E_F$ of the $Bi_2Se_3$ samples using EDL gating. Similar dynamic tuning of optical properties in layered-structure $MoSe_2$ further confirms the nature of the optical modulation behavior via the EDL gating technique. The subtle difference in their gating voltage dependence is consistent with the difference of $E_F$ positions inside those two materials. The simultaneous tuning of both absorption edge and plasma edge will lead to potential applications in wide spectral range optical modulators and electrically controlled smart windows. A dual-gate EDL-FET configuration may be employed to improve the switching rate in a small tuning range.

Example Methods:

Solvothermal Synthesis of Bismuth Selenide Nanoplates and Device Fabrication

Figure 8A:
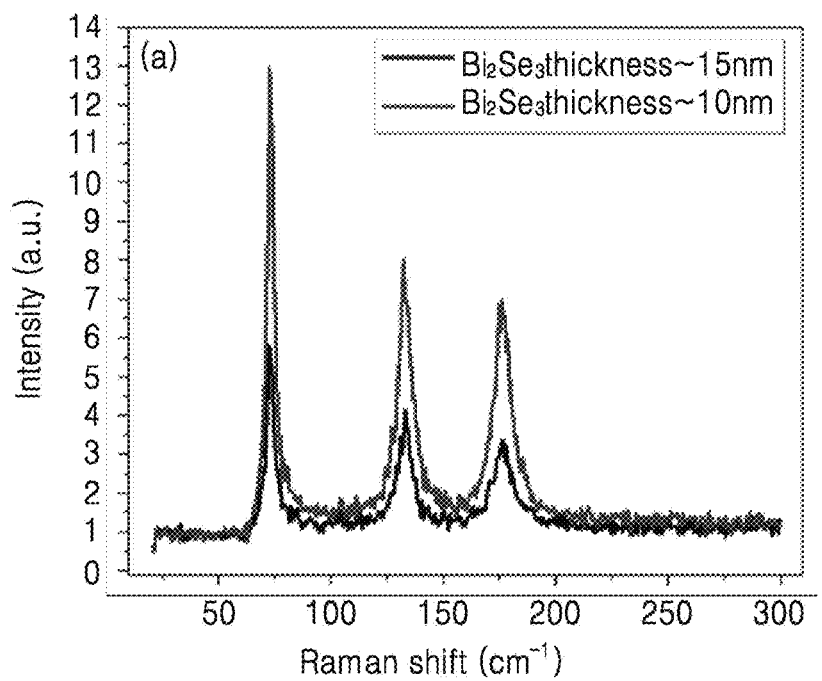
FIG. 8A to 8B are graph of raman spectra.
Figure 8B:
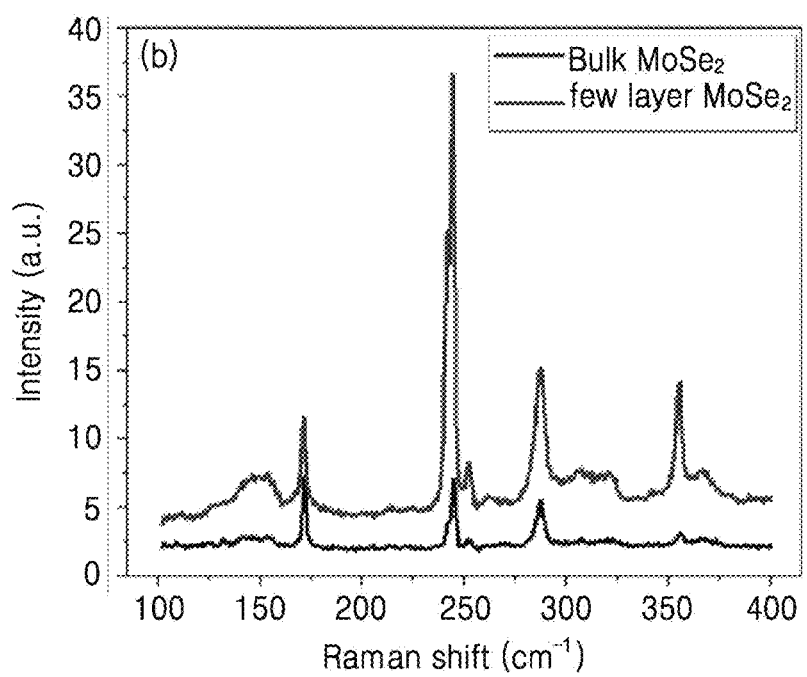
Figure 9A:
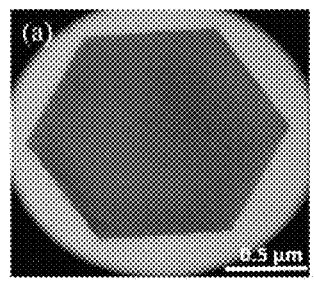
FIG. 9A to 9B shows TEM image and electron diffraction pattern of $Bi_2Se_3$ nanoplates.
Figure 9B:
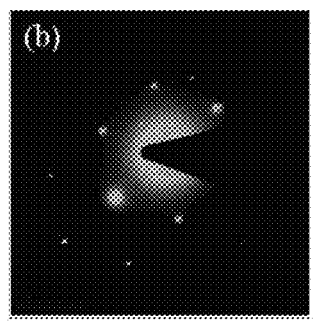

Dynamic $Bi_2Se_3$ nanoplates were prepared using solvothermal synthesis [see, e.g., Kong, D. S., Koski, K. J., Cha, J. J., Hong, S. S. & Cui, Y. Ambipolar Field Effect in Sb-Doped Bi2Se3 Nanoplates by Solvothermal Synthesis. Nano Lett 13, 632-636 (2013).]. Selenium powder (3 mmol, metal basis) and $Bi_2O_3$ powder (1 mmol, metal basis), were dissolved in ethylene glycol (30 ml), followed by the additions of ethylene diamine tetraacetic acid (EDTA, $(HO_2CCH_2)_2NCH_2CH_2N(CH_2N(CH_2CO_2H)_2$, Alfa Aesar company) powder and high-purity polyvinylpyrrolidone ($PVP,(C_6H_9NO)_n$, Alfa Aesar company). The resulting suspension was sonicated and then sealed in a steel autoclave. Afterwards, the autoclave was heated in an oven at a temperature of around 200° C. for 24 hours and then gradually cooled to room temperature. The resulting black solution was collected by filtration, washed with ethanol several times, and then dried in a vacuum ($10^{-3}$ Torr) oven at 90° C. The resulting black power was diluted with ethanol to create a suspension, and then deposited on glass substrates using a pipette. The average thickness and lateral size of the nanoplates can be optimized by modifying the concentration of EDTA and temperature. The multilayer $MoSe_2$ flakes were prepared by mechanical exfoliation. The electrical devices were fabricated using photolithography to pattern the electrodes. The nanoplates were then subjected to reactive-ion etching in order to remove any organic residue and surface oxide. E-beam evaporation of 5 nm/100 nm of chromium/gold was used to create the source/drain and gate electrodes. Subsequently, the samples were attached to a chip holder using wire bonding. The process of the device fabrication is shown in FIG. 13A to 13D. The thicknesses of the samples were confirmed by AFM measurements and the thickness of the hexagonal flakes range from around 8 nm to 22nm. The chemical identity of the $Bi_2Se_3$ nanoplates and quality of multiple $MoSe_2$ flakes were confirmed by Raman spectroscopy (FIG. 8A to 8B). To confirm the crystallinity of the $Bi_2Se_3$ nanoplates, we also performed transmission electron microscopy (FIG. 9A to 9B).

Optical Transmission, Reflection and Electric Transport Measurements

Dynamic $Bi_2Se_3$ nanoplates were deposited onto glass substrates by drop-casting. All electron transport property measurements were performed in a standard probe station in air at room temperature. Before the electrical measurements, AFM measurements were used to measure the thickness of the $Bi_2Se_3$ nanoplates and multilayer $MoSe_2$ flakes. Their optical transmission images and spectra at visible wavelengths were measured under EDL gating effects using a Nikon Eclipse CI-L and Nikon confocal C1 microscope, respectively. The applied gate voltage was provided by a source meter (Keithley-2400). Reflection and transmission spectra at near infrared regions were measured using a Bruker Hyperion 2000 infrared microscope and IFS-125/HR Fourier transform infrared spectrometer at room temperature. A transparent knife-edge aperture was used to adjust the beam size such that all of the detected transmitted and reflected light was from the nanoplate sample and not from the nearby substrate. All infrared reflection and transmission results are normalized to the reflection of pure gold and transmission of a bare glass substrate, respectively.

Materials Synthesis and Device Fabrication $Bi_2Se_3$ single crystals were synthesized by solvothermal synthesis, the details of which were described above. The other layered structure multilayer flakes were prepared using mechanical exfoliation. Experiments were performed on the layered structure nanomaterials using electrical devices fabricated on their surface. The devices were fabricated using conventional photolithography and e-beam deposition techniques, processes with micrometer scale accuracy. The thicknesses of the multiple samples were determined using optical and AFM imaging techniques. The device configurations of $Bi_2Se_3$ nanoplates and the other layered structure flakes measured in this study were typically 50 μm wide and 30 μm long. Reactive ion etching was performed prior to the deposition of gold electrodes. The electrodes were deposited by e-beam evaporation (5 nm Cr, 100 nm Au) patterned via standard photolithography procedures.

FIG. 7 shows atomic force microscopy (AFM) images of the $Bi_2Se_3$ nanoplates. Line profile across the AFM image in a and b, which shows a clear value of around 12 nm and 22 nm for the two nanoplate thickness. Scale bar, 10 μm.

Identification of Materials by Raman Spectroscopy

All the studied layered structure materials were identified using a Micro-Raman spectrometer (LabRAM HR Evolution, HORIBA)) in the scattering configuration excited with laser wavelength λ=473 nm. A typical Raman spectrum consisting of different peaks is shown in FIG. 8, where the corresponding peaks location agree well with the reported Raman spectrum of $Bi_2Se_3$ nanoplates and the other layered structure nanomaterials.

Raman spectra of FQLs $Bi_2Se_3$ nanoplates(shown in FIG. 8A) and $MoSe_2$ (shown in FIG. 8B) in the 10-450 $cm^{-1}$ region. The corresponding peak locations are consistent with the reported Raman spectrum of $Bi_2Se_3$ nanoplates and other layered structure nanomaterials.

Characterization of the Crystal Structure of Bi2Se3 Nanoplates

To confirm the crystallinity of the $Bi_2Se_3$ nanoplates, we performed transmission electron microscopy (TEM). FIG. 9A is a typical low magnification TEM image of the $Bi_2Se_3$ nanoplates. The electron diffraction results (shown in FIG. 9B) demonstrate the single crystalline nature of the nanoplates.

Consistent Results across Multiple Devices

To confirm that the nature of the optical modulation in $Bi_2Se_3$ nanolates via IL gating were consistent across multiple devices, a similar modulated transmission spectra of a second device of similar dimensions with an alternative IL ([EMIM]-[BF4]) was characterized in FIG. 10a. The optical modulation of the second device with new IL proved to behave similarly (absorption edge at short wavelengths and plasma edge at long wavelengths) to the data reported in the main text. The slight differences between the optical spectrums shows a large absorption peak at the range of wavelengths between 2.7-3.3 μm which is characteristic of the new IL. We also plotted two fixed wavelength points ($\lambda$=1.5 μm and $\lambda$=3.5 μm) and the relationship between the transmission value and IL gate voltage as shown in FIG. 10c. Similar transfer characteristics ($I_{DS}$-$V_G$) of the $Bi_2Se_3$ nanoplates via the IL ([DEME]-[TFSI]) and ([EMIM]-[BF4]) gating effect were shown in FIG. 12a and FIG. 12b, respectively.

Transmission spectra of the $Bi_2Se_3$ nanoplates at near infrared regions with a new IL under positive (shown in FIG. 10A) and negative (shown in FIG. 10B) IL gating bias. The results show a similar behavior (absorption edge at short wavelength and plasma edge at long wavelength) to the data reported in the main text. Transmission as a function of the gate voltage at short ($\lambda$=1.5 μm) and long ($\lambda$=3.5 μm) wavelengths.

Reflection spectra of the $MoSe_2$ flakes under the applied positive(shown in FIG. 11A) and negative(shown in FIG. 11B) IL gating effect. The modulated spectra at near-infrared regions clearly demonstrates the similar optical modulation behaviour of the layered structure $Bi_2Se_3$ nanoplates.

Figure 12B:
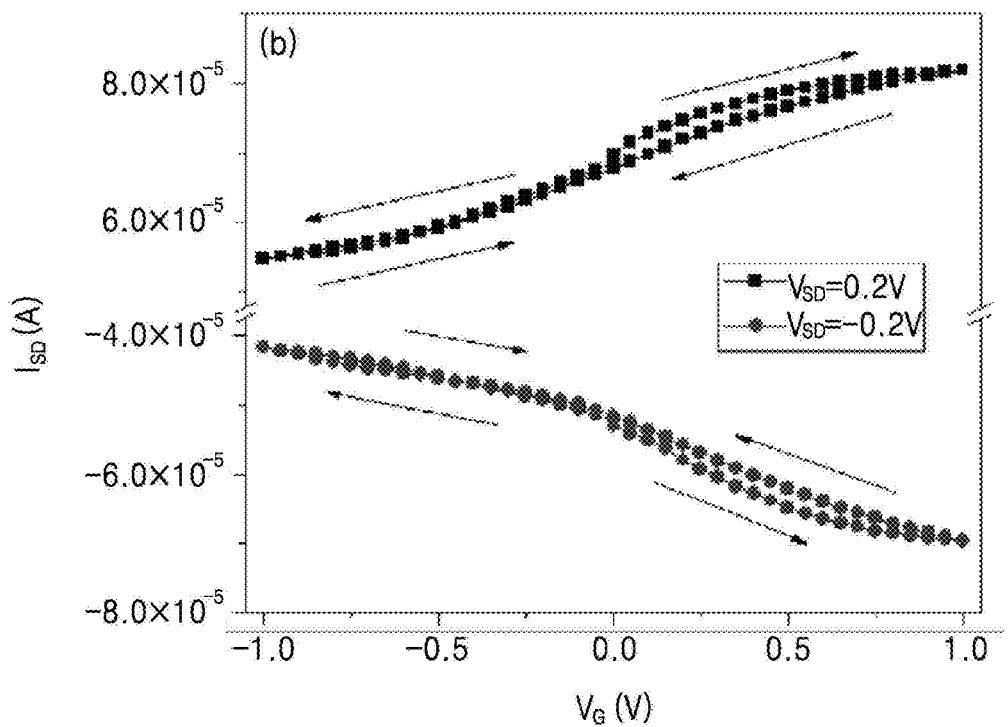
Figure 13A:
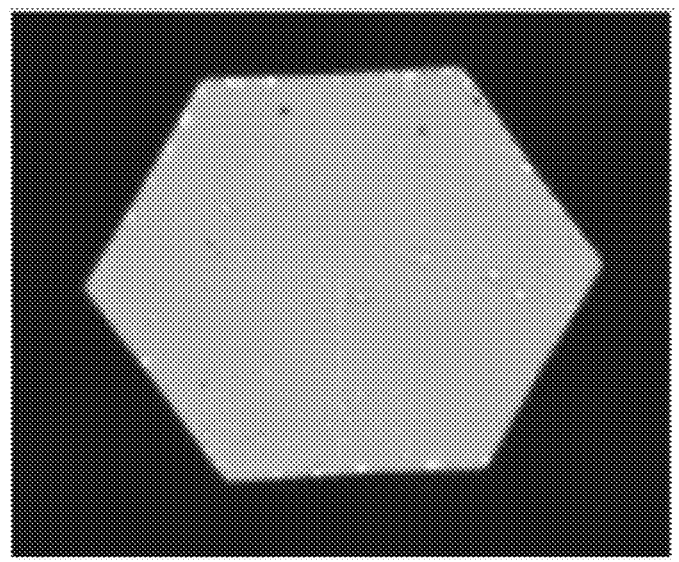
FIG. 13A to 13D shows process for device fabrication.
Figure 13B:
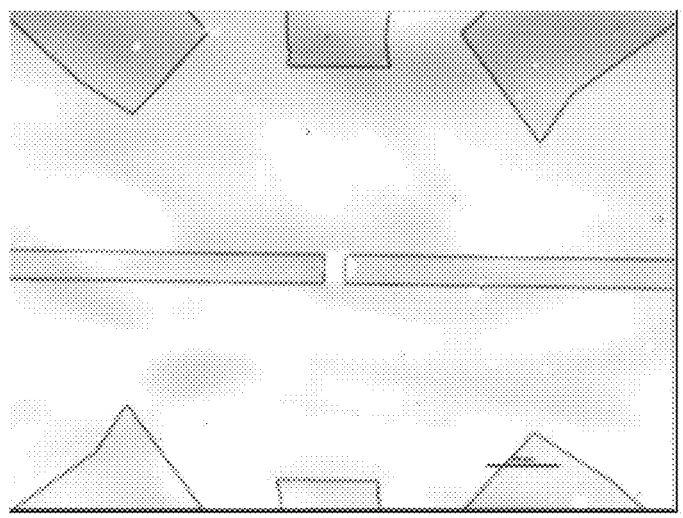
Figure 13C:
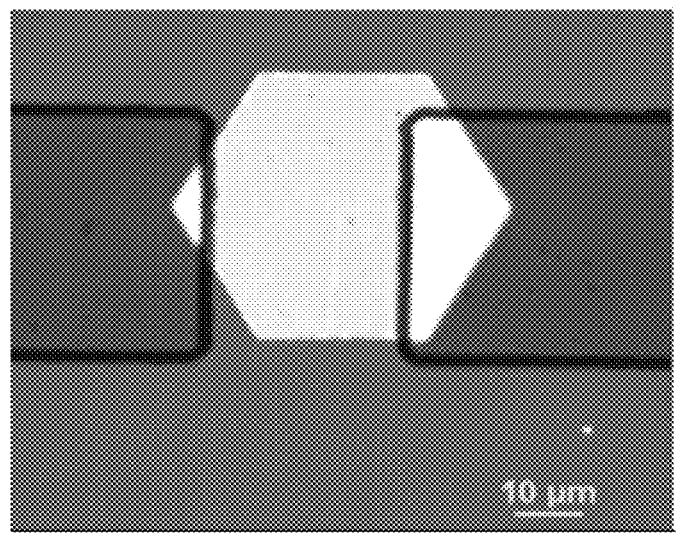
Figure 13D:
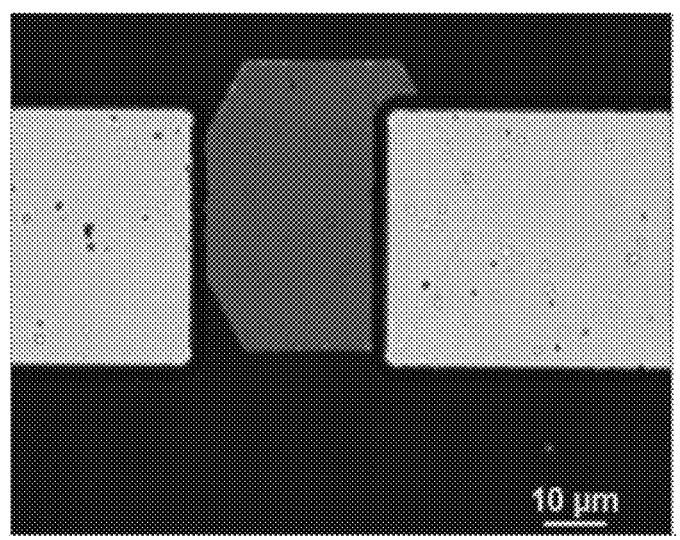

Transfer characteristics ($I_{DS}$-$V_G$) of the $Bi_2Se_3$ nanoplates via IL ([DEME]-[TFSI]) (shown in FIG. 12A) and ([EMIM]-[BF4]) gating effect(shown in FIG. 12B).

Exemplary Embodiments

One Embodiment of Optoelectronic Device

An optoelectronic device 100 according to an embodiment will be described below with reference to FIGS. 14 to 17.

Figure 14:
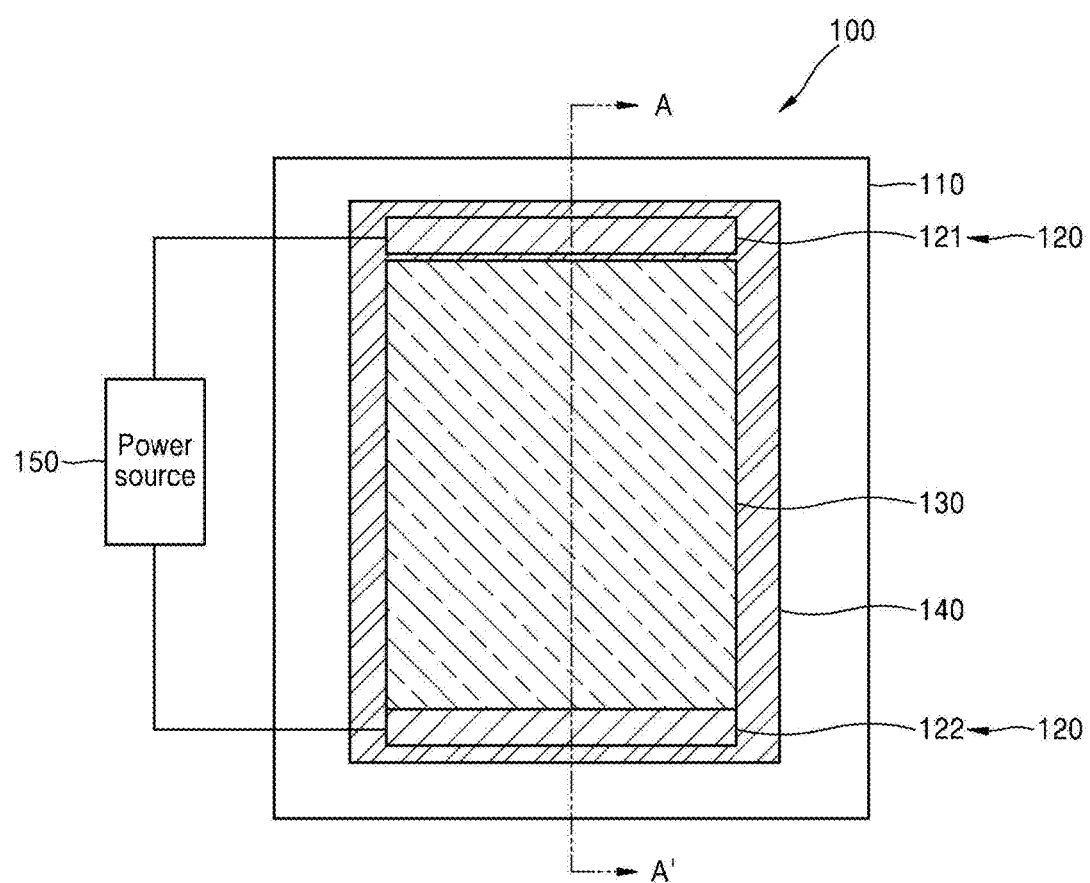
FIG. 14 is a schematic plan view of an optoelectronic device 100 according to an embodiment.
Figure 15:
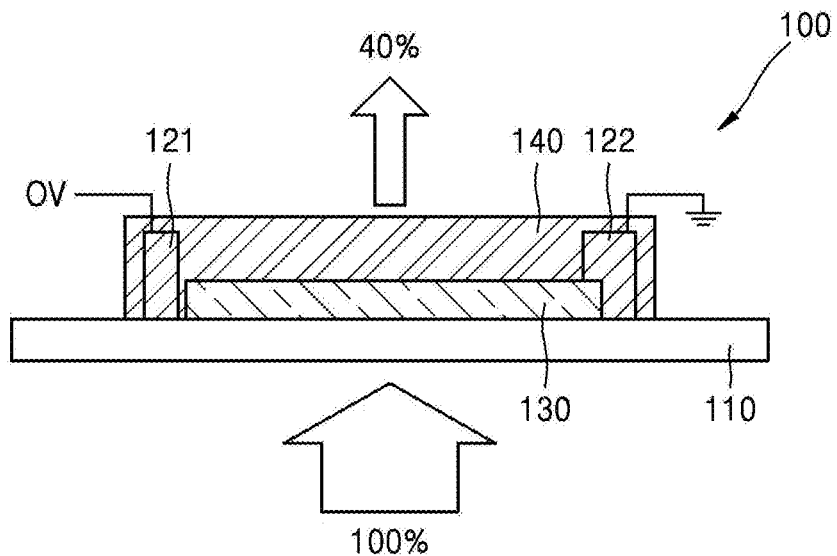
FIG. 15 is a schematic cross-sectional view of the optoelectronic device 100 taken along line A-A' of FIG. 14.
Figure 16:
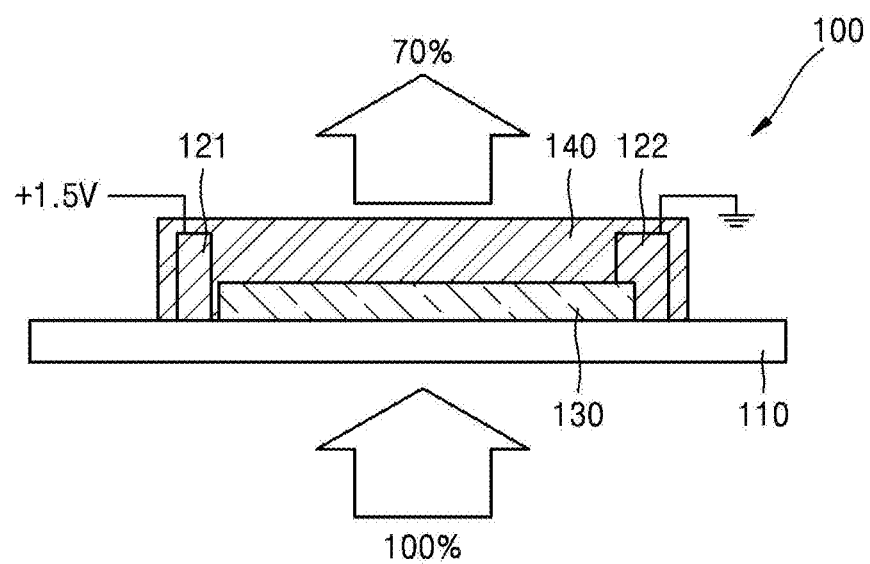
FIG. 16 is a schematic cross-sectional view showing a state in which a positive voltage is applied to a first electrode 121 of the optoelectronic device 100 of FIG. 14.
Figure 17:
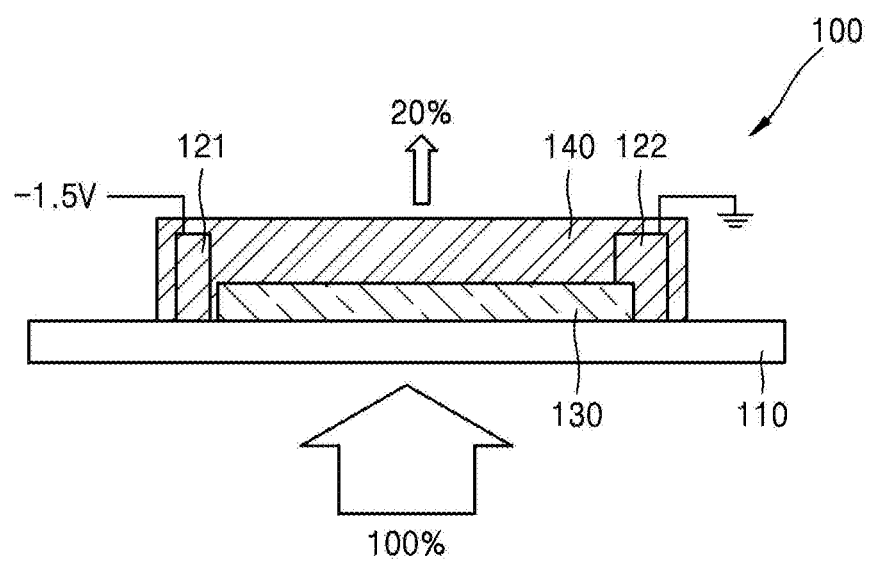
FIG. 17 is a schematic cross-sectional view showing a state in which a negative voltage is applied to the first electrode 121 of the optoelectronic device 100 of FIG. 14.

FIG. 14 is a schematic plan view of an optoelectronic device 100 according to an embodiment. FIG. 15 is a schematic cross-sectional view of the optoelectronic device 100 taken along line A-A' of FIG. 14. FIG. 16 is a schematic cross-sectional view showing a state in which a positive voltage is applied to a first electrode 121 of the optoelectronic device 100 of FIG. 14. FIG. 17 is a schematic cross-sectional view showing a state in which a negative voltage is applied to the first electrode 121 of the optoelectronic device 100 of FIG. 14.

Referring to FIG. 14, the optoelectronic device 100 may include a substrate 110, an electrode member 120, an active layer 130, an ionic liquid 140, and a power source 150.

The substrate 110 may include a material that is transparent or semi-transparent to light of an infrared or visible region. For example, the substrate 110 may include at least one material selected from glass, sapphire, quartz, silicon dioxide, silicon nitride, gallium nitride, ITO, AZO, IZO, FTO, CdO, CdZnO, CdNiO, and PEDOT.

The electrode member 120 may include a first electrode 120 and a second electrode 122. The first electrode 121 and the second electrode 122 may be spaced apart from each other. The first electrode 121 and the second electrode 122 may be coupled with the power source 150 so that voltages are applied thereto. The first electrode 121 and the second electrode 122 may be located or disposed on the same surface of the substrate 110.

The active layer 130 may be between the first electrode 121 and the second electrode 122. The first electrode 121 may be spaced apart from the active layer 130 by a certain distance so that the first electrode 121 is electrically isolated from, or isolated from, the active layer 130. The second electrode 122 may be in contact with the active layer 130 so that the second electrode 122 is electrically connected with the active layer 130. When viewed from above the optoelectronic device 100 in a vertical direction, the active layer 130 may not be covered with the electrode member 120. This prevents light transmitting through the active layer 130 from being scattered by the electrode member 120.

The active layer 130 may include a chalcogenide nanoplate. The chalcogenide nanoplate may include at least one selected from $Bi_2Se_3$, $MoSe_2$, GaSe, $MoS_2$, $WSe_2$, $WS_2$, $Bi_2Te_3$, ZnSe, InSe, $In_2Se_3$, and $ReS_2$. Since optical modulation properties and behaviors of the optoelectronic device 100 when the active layer 130 includes bismuth selenide nanoplate ($Bi_2Se_3$) have been described above with reference to FIGS. 2A to 2C, 3A to 3C, and 4A to 4D, detailed descriptions thereof will be omitted. Since optical modulation properties and behaviors of the optoelectronic device 100 when the active layer 130 includes molybdenum selenide ($MoSe_2$) have been described above with reference to FIGS. 4A to 4D and 5A to 5C, detailed descriptions thereof will be omitted.

The active layer 130 may include a 2D layered structure material. The 2D layered structure material refers to a material that can naturally form a 2D layered structure and can be made into a thin layer on the order of ten nanometers or a few nanometers thick. For example, the 2D layered structure material may include at least one material selected from bismuth selenide, molybdenum selenide, black phosphorus, ZnO, GaAs, and Ge.

The active layer 130 may have a thin thickness of about 20 nm or less. For example, since the active layer 130 includes the 2D layered structure material, the active layer 130 may have a thin thickness of about 20 nm or less. The active layer 130 my have a shape of a square, a circle, a triangle, an ellipse, a rectangle, a hexagon, or other type of polygon. The shape of the active layer 130 may be differently determined according to the exterior design of the optoelectronic device 100 and is not limited to specific embodiments.

The ionic liquid 140 may cover the active layer 130. The ionic liquid 140 may include N-diethyl-N-(2-methoxyethyl)-N-methylammonium bis-(trifluoromethylsulfonyl)-imide. For example, the ionic liquid 140 may include at least one selected from [EMIM]-[BF4], [DEME][BF4], [BMIM][BF4], [BMIM][TFSI], [TMPA][BF4], [DEME][FSI], [EMIM][FSI], and [DEME]-[TFSI]. The ionic liquid 140 serves as a type of gate dielectric and can be driven at a low power as compared to a conventional oxide dielectric and can control charge-carrier density over a wide range. When a gate voltage is applied to the first electrode 121, charges are induced at a solid/liquid interface between the first electrode 121 and the ionic liquid 140, and charges are induced at a solid/liquid interface between the active layer 130 and the ionic liquid 140. Since charges are induced at the two solid/liquid interfaces, this may be referred to as an electric double layer (EDL). The EDL may have a large capacitance caused by nanogap capacitors. Therefore, the optoelectronic device 100 according to the present embodiment can accumulate or deplete larger quantities of charge carriers at the interfaces than a conventional FET structure under the same gate voltage, thereby improving modulation efficiency.

The ionic liquid 140 may be applied on the active layer 130 by a pipette method or may be applied on the active layer 130 by a spin coating method. A method of applying the ionic liquid 140 is not limited to specific embodiments and various methods can be used herein.

The power source 150 may be coupled with the electrode member 120. The power source 150 may modulate an optical property of the optoelectronic device 100 by applying a certain voltage to the electrode member 120. As described above, modulation behaviors of the optical property may be significantly altered according to materials of the active layer 130 and a sign and magnification of an applied voltage.

The optoelectronic device 100 may further include a protection layer (not shown) covering the device. The protection layer (not shown) may include a material that is transparent to an operating wavelength region of the optoelectronic device 100. For example, as shown in FIG. 1F, the protection layer (not shown) may be a cover glass. For example, the protection layer (not shown) may encapsulate the ionic liquid.

Referring to FIG. 15, when no voltages are applied to the first electrode 121 and the second electrode 122, the optoelectronic device 100 may have transparency of a certain level. For example, when 100% incident light transmits through the active layer 130 including the bismuth selenide nanoplate, 40% light may transmit through the optoelectronic device 100. That is, for example, the transparency of the optoelectronic device 100, to which no voltage is applied, may be 40%.

Referring to FIG. 16, when a positive voltage is applied to the first electrode 121, the transparency of the optoelectronic device 100 may increase. For example, when 100% incident light transmits through the active layer 130 including the bismuth selenide nanoplate, 70% light may transmit through the optoelectronic device 100. The modulation of the optical property of bismuth selenide may increase transparency of the optoelectronic device 100. The transparency of the optoelectronic device 100 according to the present embodiment may change 10% or more even when a positive voltage of 3 V or less is applied to the first electrode 121.

Referring to FIG. 17, when a positive voltage is applied to the first electrode 121, the transparency of the optoelectronic device 100 may increase. For example, when 100% incident light transmits through the active layer 130 including the bismuth selenide nanoplate, 70% light may transmit through the optoelectronic device 100. The modulation of the optical property of bismuth selenide may reduce the transparency of the optoelectronic device 100. The transparency of the optoelectronic device 100 according to the present embodiment may change 10% or more even when a negative voltage of 3 V or less is applied to the first electrode 121.

Another Embodiment of Optoelectronic Device

An optoelectronic device 200 according to another embodiment will be described below with reference to FIGS. 18 to 20.

Figure 18:
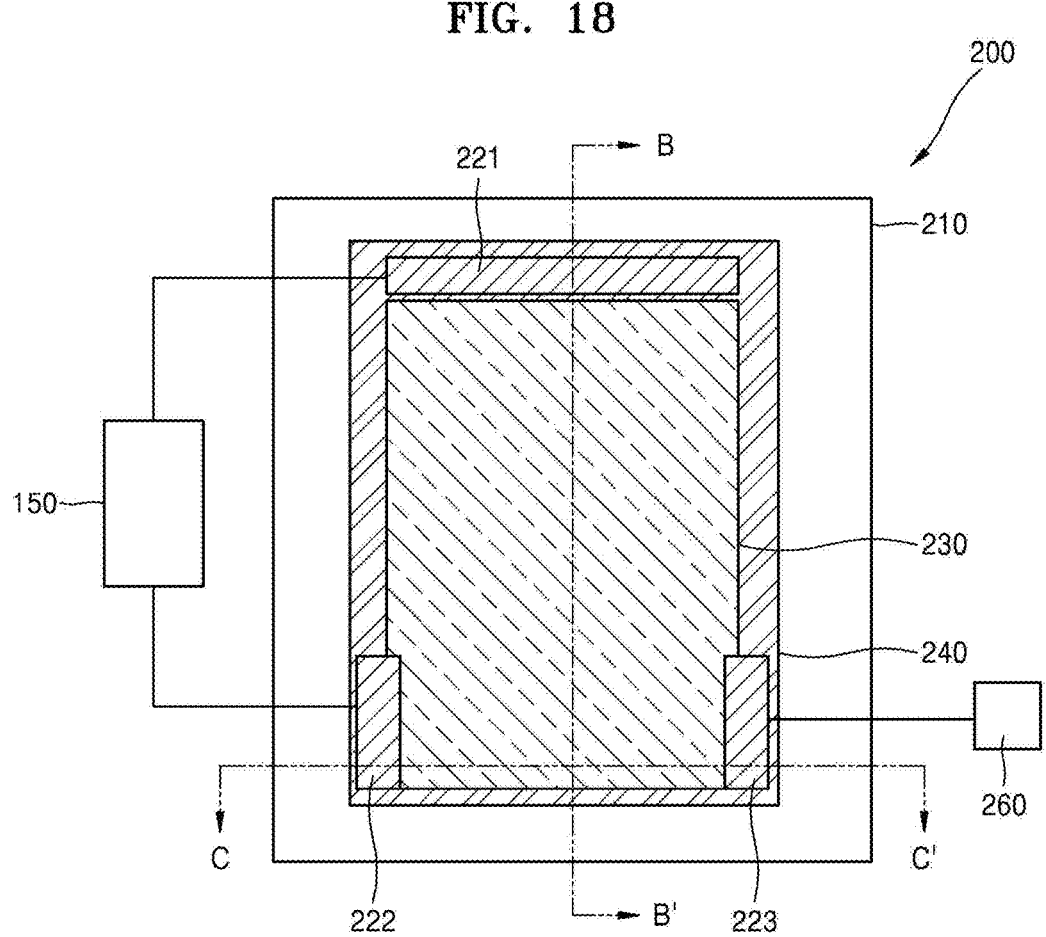
FIG. 18 is a schematic plan view of an optoelectronic device 200 according to another embodiment.

FIG. 18 is a schematic plan view of an optoelectronic device 200 according to another embodiment. FIG. 19 is a schematic cross-sectional view of the optoelectronic device 200 taken along line B-B' of FIG. 18. FIG. 20 is a schematic cross-sectional view of the optoelectronic device 200 taken along line C-C' of FIG. 18.

The optoelectronic device 200 may include a substrate 210, an electrode member 220, an active layer 230, an ionic liquid 240, and a power source 250.

The substrate 210 may include a material that is transparent or semi-transparent to light of an infrared or visible region. The electrode member 220 may include a first electrode 221, a second electrode 222, and a third electrode 223. The active layer 230 may be electrically insulated from the first electrode 221 and may be electrically connected with the second electrode 222 and the third electrode 223. The ionic liquid 240 may cover the active layer 230. The power source 250 may be coupled with the electrode member 220.

The electrode member 220 may include the first electrode 221, the second electrode 222, and the third electrode 223. The first electrode 221 may be electrically isolated from the active layer 230. The first electrode 221 may function as a gate electrode. The second electrode 222 and the third electrode 223 may be electrically connected with the active layer 230. The second electrode 222 may function as a drain electrode and the third electrode 223 may function as a source electrode. The second electrode 222 and the third electrode 223 may face each other, with the active layer 230 disposed therebetween.

The optoelectronic device 200 according to the present embodiment may operate in the same manner as the optoelectronic device 100 of FIG. 14. The optical property of the active layer 230 may be modulated according to a case where no voltage is applied to the first electrode 221, a case where a positive voltage is applied thereto, or a case where a negative voltage is applied thereto. For example, when the negative voltage is applied to the first electrode 221, the transparency of the active layer 230 may decrease, and when the positive voltage is applied to the active layer 230, the transparency of the active layer 230 may increase. Since the first electrode 221, the second electrode 222, and the third electrode 223 do not cover the active layer 230, it is possible to prevent scattering of light transmitting through the active layer 230. In terms of these points, the optoelectronic device 200 according to the present embodiment may differ from the conventional FET structure.

Figure 19:
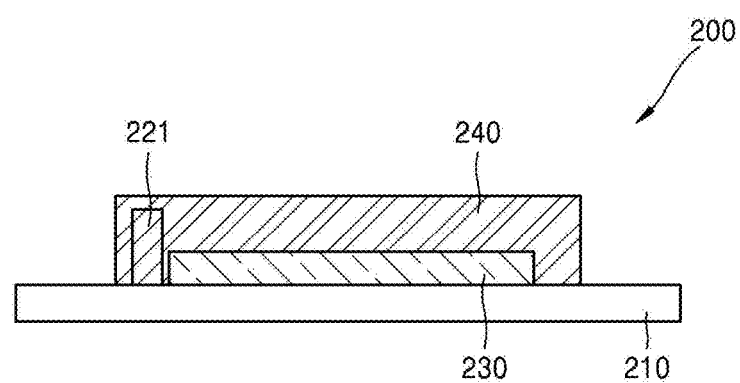
FIG. 19 is a schematic cross-sectional view of the optoelectronic device 200 taken along line B-B' of FIG. 18.
Figure 20:
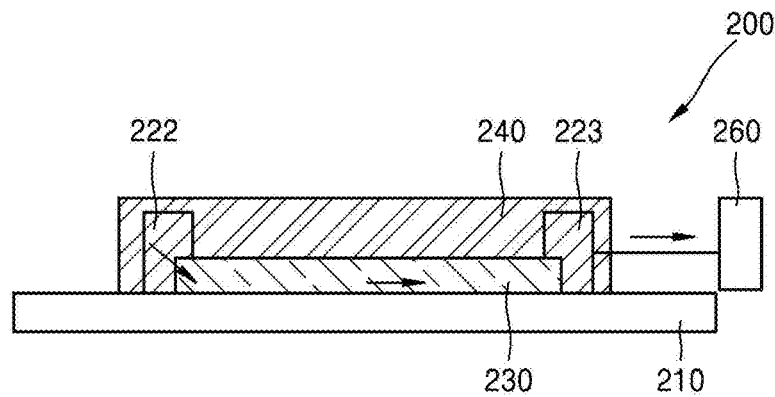
FIG. 20 is a schematic cross-sectional view of the optoelectronic device 200 taken along line C-C' of FIG. 18.

Referring to FIGS. 19 and 20, when a voltage is applied to the first electrode 221, a certain current may flow from the second electrode 222 to the third electrode 223.

One Embodiment of Smart Window

Figure 21:
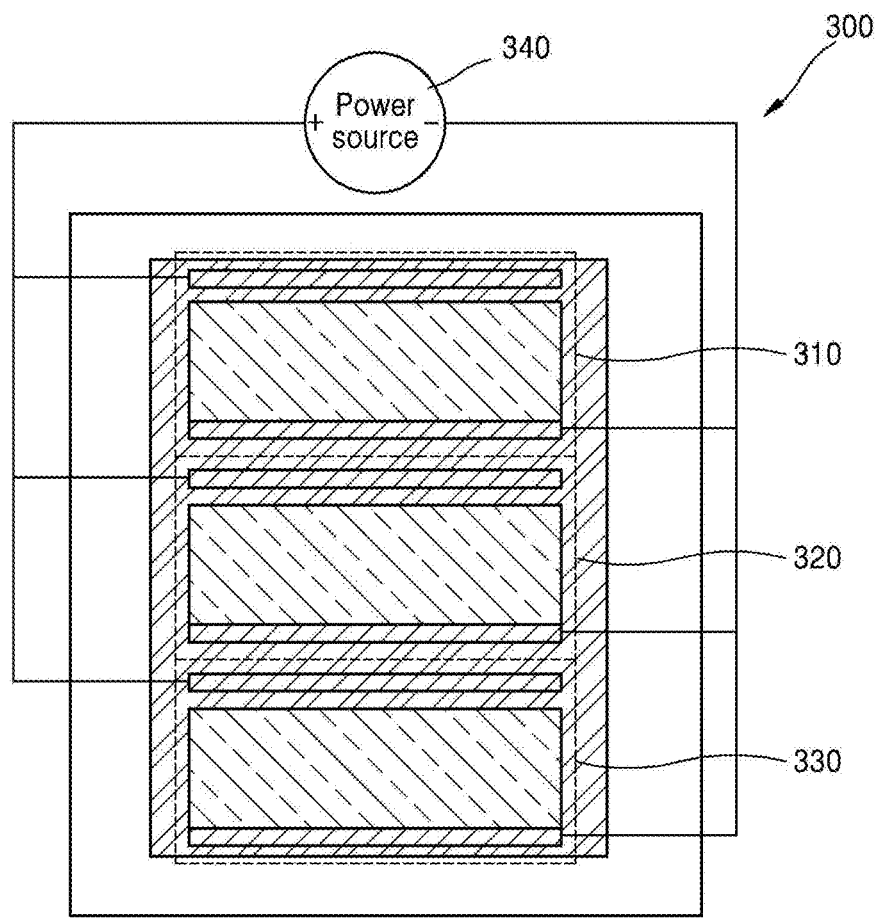
FIG. 21 is a schematic plan view of a smart window 300 according to an embodiment.

FIG. 21 is a schematic plan view of a smart window 300 according to an embodiment. The smart window 300 may include a plurality of optoelectronic devices 310, 320, and 330. The smart window 300 may be required to change large-area optical transparency. In this regard, the arrangement of the plurality of optoelectronic devices 310, 320, and 330 can realize the smart window 300 that has a fast response speed and can change the transparency even with a low voltage. The plurality of optoelectronic devices 310, 320, and 330 may change the optical transparency by a positive voltage or a negative voltage applied by the power source 340.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An optoelectronic device comprising:
    a substrate;
    an electrode member disposed on the substrate, wherein the electrode member comprises a first electrode and a second electrode;
    an active layer located between the first electrode and the second electrode; and
    an ionic liquid covering the active layer, the first electrode and the second electrode.

2. The optoelectronic device of claim 1, wherein the active layer comprises a chalcogenide nanoplate.

3. The optoelectronic device of claim 2, wherein the chalcogenide nanoplate comprises at least one material selected from $Bi_2Se_3$, $MoSe_2$, GaSe, $MoS_2$, $WSe_2$, $WS_2$, $Bi_2Te_3$, ZnSe, InSe, $In_2Se_3$, and $ReS_2$.

4. The optoelectronic device of claim 1, wherein the active layer comprises a two-dimensional (2D) layered structure material.

5. The optoelectronic device of claim 4, wherein the 2D layered structure material comprises at least one material selected from $Bi_2Se_3$, $MoSe_2$, black phosphorus, ZnO, GaAs, Si and Ge.

6. The optoelectronic device of claim 1, wherein a thickness of the active layer is about 20 nm or less.

7. The optoelectronic device of claim 1, wherein the ionic liquid comprises at least one material selected from [DEME][TFSI], [DEME][BF4], [EMIM]-[BF4], [BMIM][BF4], [BMIM][TFSI], [TMPA][BF4], [DEME][FSI], and [EMIM][FSI].

8. The optoelectronic device of claim 1, further comprising a power source coupled with the electrode member, wherein the power source modulates an optical property of the optoelectronic device.

9. The optoelectronic device of claim 8, wherein the power source applies a voltage of −3 V to 3 V to the electrode member so as to modulate transparency of the optoelectronic device.

10. The optoelectronic device of claim 1, wherein the first electrode is electrically isolated from the active layer.

11. The optoelectronic device of claim 1, wherein the substrate comprises at least one material selected from glass, sapphire, quartz, silicon dioxide, silicon nitride, gallium nitride, plastics, boron nitride, ITO, AZO, IZO, FTO, CdO, CdZnO, CdNiO, PEDOT, and graphene.

12. The optoelectronic device of claim 1, further comprising a protection layer covering the optoelectronic device.

13. The optoelectronic device of claim 12, wherein the ionic liquid is encapsulated by the protection layer.

14. The optoelectronic device of claim 1, wherein the ionic liquid covers the active layer having been applied by a spin coating method or a pipette method.

15. The optoelectronic device of claim 1, wherein the active layer has a shape of a square, a circle, a triangle, an ellipse, a rectangle, a hexagon, or other type of polygon.

16. A smart window comprising:
    a plurality of optoelectronic devices of claim 1; and
    a power source coupled with the plurality of optoelectronic devices, wherein the power source modulates optical properties of the plurality of optoelectronic devices.

17. An optoelectronic device comprising:
    a substrate;
    an electrode member disposed on the substrate, wherein the electrode member comprises a first electrode and a second electrode;
    an active layer located between the first electrode and the second electrode; and
    an ionic liquid covering the active layer,
    wherein the electrode member further comprises a third electrode disposed on the substrate, and wherein the first electrode is electrically isolated from the active layer and functions as a gate electrode, the second electrode is electrically connected with the active layer and functions as a drain electrode, and the third electrode is electrically connected with the active layer and functions as a source electrode.

18. The optoelectronic device of claim 17, wherein the third electrode is disposed on the same surface of the substrate with the first electrode and the second electrode.

19. A smart window comprising:
    a plurality of optoelectronic devices of claim 17; and
    a power source coupled with the plurality of optoelectronic devices, wherein the power source modulates optical properties of the plurality of optoelectronic devices.

20. The optoelectronic device of claim 17, wherein the active layer comprises a chalcogenide nanoplate.

* * * * *